United States Patent
Florek et al.

(10) Patent No.: US 9,590,305 B2
(45) Date of Patent: Mar. 7, 2017

(54) NON-STATIONARY MAGNETIC FIELD EMITTER, ITS CONNECTION IN SYSTEM AND DATA MODULATION METHOD

(71) Applicant: SMK CORPORATION, Shinagawa-Ku (JP)

(72) Inventors: Miroslav Florek, Bratislava (SK); Libor Majer, Sliac (SK); Emil Hubinak, Piestany (SK)

(73) Assignee: SMK Corporation (JP)

( * ) Notice: Subject to any disclaimer, the term of this patent is extended or adjusted under 35 U.S.C. 154(b) by 0 days.

(21) Appl. No.: 14/442,579

(22) PCT Filed: Nov. 15, 2013

(86) PCT No.: PCT/IB2013/060178
§ 371 (c)(1),
(2) Date: May 13, 2015

(87) PCT Pub. No.: WO2014/076669
PCT Pub. Date: May 22, 2014

(65) Prior Publication Data
US 2016/0020517 A1      Jan. 21, 2016

(30) Foreign Application Priority Data

Nov. 15, 2012 (SK) ............................ PP 50053-2012
Feb. 27, 2013 (SK) ............................ PP 50004-2013
Nov. 14, 2013 (SK) ............................ PP 50048-2013

(51) Int. Cl.
*H04B 5/00*     (2006.01)
*H01Q 7/08*     (2006.01)
(Continued)

(52) U.S. Cl.
CPC ............. *H01Q 7/08* (2013.01); *H01Q 1/2225* (2013.01); *H01Q 1/526* (2013.01); *H04B 1/16* (2013.01); *H04B 5/0025* (2013.01); *H04W 4/008* (2013.01)

(58) Field of Classification Search
CPC .................................. H01Q 7/06; H01Q 7/08
(Continued)

(56) References Cited

U.S. PATENT DOCUMENTS

2004/0183733 A1    9/2004  Aoyama et al.
2007/0194913 A1    8/2007  Yokoshima et al.
(Continued)

FOREIGN PATENT DOCUMENTS

CN      201215827     4/2009
CN      101577740     11/2009
(Continued)

OTHER PUBLICATIONS

Finkenzeller, "RFID Handbook, Fundamentals and Applications in Contactless Smart Cards, Radio Frequency Identification and Near-Field Communication", Third Edition, © 2010, 480 pages.

*Primary Examiner* — Lee Nguyen
(74) *Attorney, Agent, or Firm* — Baker & Hostetler LLP

(57) ABSTRACT

The emitter is intended to provide a contactless communication channel (particularly RFID/NFC) in miniature build space. The emitter has an oblong, at least partially ferrite core (1), the core (1) is winded up by a wire (4) with at least two threads (2), the threads (2) are on the core (1) placed tightly next to each other and the effective width (w) of one thread (2) corresponds to the radius of the core (1) in the circular core (1) cross-section, or corresponds to the equivalent radius in other shapes of the core (1) with deviation up to +−75%. The wire (4) of the coil is flat, or the coil includes several wires held parallel to each other (41 to 4N) forming (Continued)

a multi-stage thread. The emitter can be placed in the removable memory card (5) and/or on the PCB board (10) and/or SIM card (9) and/or battery (11). Modulation of data transmitted by the emitter uses electromagnetic wave generator with a frequency different from the receiver, difference of these frequencies corresponds to the subcarrier frequency.

33 Claims, 12 Drawing Sheets

(51) Int. Cl.
    *H01Q 1/22*    (2006.01)
    *H01Q 1/52*    (2006.01)
    *H04B 1/16*    (2006.01)
    *H04W 4/00*    (2009.01)
    *H04B 7/00*    (2006.01)

(58) Field of Classification Search
    USPC .................................................. 455/41.1, 45
    See application file for complete search history.

(56) References Cited

U.S. PATENT DOCUMENTS

| | | | |
|---|---|---|---|
| 2008/0225932 A1* | 9/2008 | Fukuda | ................. G01S 13/758 |
| | | | 375/216 |
| 2009/0314842 A1 | 12/2009 | Charrin | |
| 2010/0258639 A1 | 10/2010 | Florek et al. | |
| 2011/0238518 A1* | 9/2011 | Florek | .............. G06K 19/07732 |
| | | | 705/26.1 |
| 2012/0119965 A1 | 5/2012 | Deguchi et al. | |

FOREIGN PATENT DOCUMENTS

| | | |
|---|---|---|
| CN | 201515004 | 6/2010 |
| CN | 201590480 | 9/2010 |
| CN | 101964073 | 2/2011 |
| CN | 102074788 | 5/2011 |
| CN | 201830251 | 5/2011 |
| DE | 1025348 A1 | 2/1958 |
| DE | 10 2004-029984 | 1/2006 |
| DE | 10 2008-005795 | 7/2009 |
| DE | 10 2010-052127 | 5/2012 |
| JP | 2004-005494 | 1/2004 |
| JP | 2004-200829 A | 7/2004 |
| JP | 2005-033461 | 2/2005 |
| JP | 2006-304184 | 11/2006 |
| JP | 2010-051012 | 3/2010 |
| JP | 2010-102531 | 5/2010 |
| JP | 2011-193349 | 9/2011 |
| KR | 100693204 | 3/2007 |
| KR | 2010-0056159 | 5/2010 |
| WO | WO 03/043101 A3 | 12/2003 |
| WO | WO 2010/143849 | 12/2010 |
| WO | WO 2012/019694 | 2/2012 |

\* cited by examiner

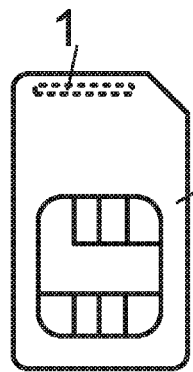 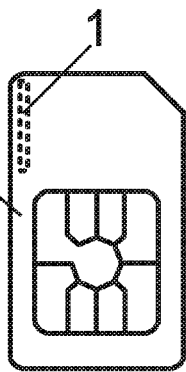 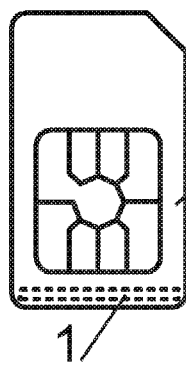 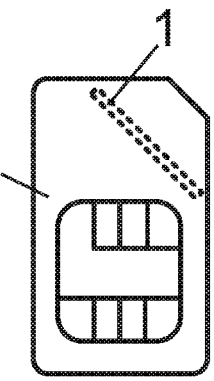
Fig.19　　Fig.20　　Fig.21　　Fig.22
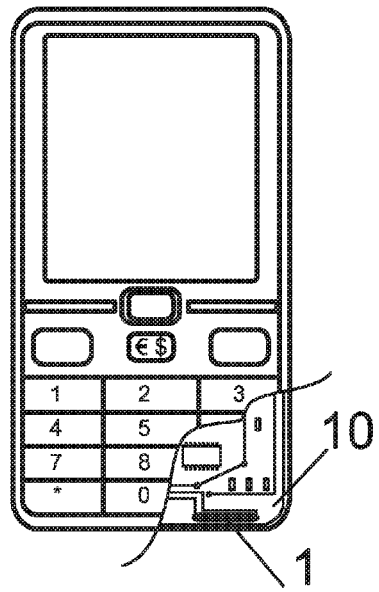
Fig.23
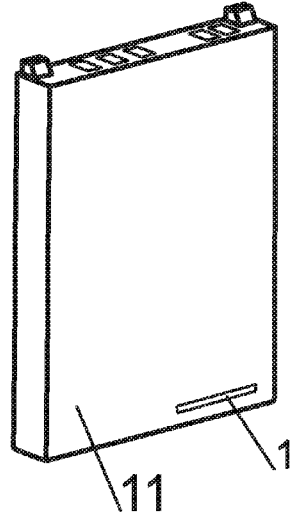
Fig.24

NON-STATIONARY MAGNETIC FIELD EMITTER, ITS CONNECTION IN SYSTEM AND DATA MODULATION METHOD

CROSS-REFERENCE TO RELATED APPLICATIONS

This application is the National Stage of International Application No. PCT/IB2013/060178, filed Nov. 15, 2013, which claims the benefit of Slovak Application Number PP50053-2012, filed Nov. 15, 2012, Slovak Application Number PP50004-2013, filed Feb. 27, 2013, and Slovak Application No. PP50048-2013, filed Nov. 14, 2013, the disclosures of which are incorporated herein by reference in their entireties.

FIELD OF INVENTION

The present invention relates to a non-stationary magnetic field emitter, which forms a miniature antenna substitute on a flat carrier with a small available build height, especially on the surface of a removable memory card, such as microSD card or SIM card. The antenna is usable particularly for creating an additional contactless NFC/RFID communication channel in a mobile phone or also on a PCB board of different electronic devices. The solution is primarily intended for payment applications implemented by means of a mobile communication device. In principle, however, a new type of emitter, its placement and method of modulation according to the invention can also be used for other applications and devices, particularly, where is not a sufficient space to enlarge the antenna, and where the antenna is, when applied in various surroundings, shielded by adjacent elements with different structure and attributes in terms of different environmental characteristics.

PRESENT TECHNOLOGY STATUS

Antenna placement directly on a removable card, which is intended for insertion into the slot of a mobile communication device, is known from the published patent documents, such as DE 10252348 A1, WO 03/043101 A3. These publications describe the general possibility of using the antenna on the card, but do not contain a sufficient antenna specification in a situation where the removable card is shielded by adjacent pieces of the mobile communication device, particularly the mobile phone.

Specifically described NFC antennas are in shape of wire loops on the surface, whereas in the case of small size all the available space is employed. When placing the NFC antenna on relatively small areas, the antenna is shaped of an inscribed rectangular spiral coil with rounded corners, which generally follows the external contour of the available area. This arrangement has created quite typical NFC antenna shape.

Antennas for NFC and RFID transmissions are, therefore, essentially flat with loop winding round the edges of a useable area, such as according to DE102008005795, CN102074788, US2009314842, CN101577740, CN201590480, CN201215827, CN201515004, CN201830251, JP2010102531, JP2011193349, KR20100056159, KR100693204, WO2010143849, JP2004005494, JP2006304184, JP2005033461, JP2010051012. When implementing such an antenna on a removable memory card, a flat card character is utilized in natural way and the antenna develops by loop winding on the available part of the largest area, as for example WO2012019694, DE102010052127, DE102004029984, CN101964073. However, frame antenna solutions on available surfaces do not lead to a desired result, and, therefore, different applicants are complementing antennas with other elements, such as ribs, layers, and the like. These solutions increase the structure difficulty and still do not lead to the creation of a reliable communication channel. At the present, are known miniature antenna solutions, like according to US 2007/0194913 A1, addressing the problem with reduction of the antenna size and its connection to the substrate, but such applications do not solve the problem with different antenna shielding. Applying the knowledge about existing NFC antennas in an area with a little available room does not produce desired results, whereas the miniaturization below a certain level does not linearly change the resulting antenna attributes.

Published Logomotion's patent applications describe the antenna configuration and particular removable memory card layers with purpose to preset emitting and receiving antenna characteristics to allow creation of a reliable communication channel even at different shielded card slots. Such defined technical task led to the creation of several technical solutions that have led to satisfactory results only with some mobile phones, and then the development advanced towards creation of larger, additional antennas on a mobile phone's body out of shielded areas. These additional antennas (CN201590480 U), for instance in the form of stickers, can be linked contactless with a basic antenna on the card, but it still remains small versatility of such an arrangement, and also complexity of application is unfavorable for the average user.

The antenna placed directly on a removable card has very limited dimensional options. Mobile phones have slots for cards of microSD format, which significantly limits size of the antenna, which can be placed directly on the card. When placing the removable card in very shielded slots, for example under the battery of a mobile phone, conditions of transmission from the antenna on the card become significantly worse. Using of rectifying layers, foils, has a narrow specific effect, and is less versatile when setting various structures of mobile phones. Basic theoretical and technical publications are of the opinion that at a small thickness and available space, the RFID or NFC antenna shall be formed as a sheet antenna, such as in RFID HANDBOOK, Klaus Finkenzeller, 2010 according to FIGS. 2.11, 2.15, 12.7, 12.9, 12.11, 12.13. In accordance with the same source (section 4.1.1.2 Optimal Antenna Diameter/Physical Principles of RFID Systems), optimal is if the radius of transmitting antenna corresponds to the square root of the required antenna range.

The standard for contactless communication ISO 14443 characterizes the conditions of the A or B modulation with carrier signal having the 13.56 MHz frequency. The data transmitted are modulated into the subcarrier frequency in the transmitter and the subcarrier frequency is combined with the basic, carrier signal. The result will be a frequency superposition with transmitted data that are detected in the receiver by separation of the carrier signal from the received spectrum.

Since there are more often being used metal components and housings in mobile phones, it can appear a problem with construction and NFC antenna placement even in a situation, where the NFC element is already foreseen in a mobile phone design, or similar communication element. Desired is that solution which ensures the high throughput of transmitted signal from the mobile phone PCB board, from SIM card, or the element on the removable memory card, which may be shielded by surrounding mobile phone metal elements, such as a battery or metal housing.

SUBJECT MATTER OF THE INVENTION

The mentioned disadvantages are significantly eliminated by a non-stationary magnetic field emitter used in the capacity of antenna, particularly the antenna on a flat substrate in an electronic device, e.g. mobile phone, where the essence of the emitter according to the invention lies in the fact that the emitter has an oblong, at least partially a ferrite core, the core is winded up with a wire with at least two threads, the threads are placed tightly next to each other and the effective width w of one thread corresponds to the radius of the core in a circular core cross-section with deviation of +−75%. In other effective core cross-sections, the width of one thread corresponds to the equivalent radius with deviation of +−75%.

Ratio from 0.25 to 1.75, preferably from 0.5 to 1.5, particularly preferably from 0.85 to 1.15 of the one thread effective width w to the core radius, or, the equivalent core radius, is not only a symptom of size dimensioning. As appeared in inventing the emitter, just a dimensional relationship observance in relation with tight wire winding shows the synergy interaction of several physical patterns. In the extent of the stated interval, is created magnetic field interaction from different parts of wires and from individual coils without forming undesirable eddy fields, whereby the magnetic field in the core is amplifying, and also it cannot leak out along the coil out of the terminal ends of the core. The stated ratio of the effective one-thread width to the core radius has not yet been an observed parameter in emitters or antennas. At existing antennas with the core, the effective width w of one thread achieves less than 0.001 to 0.1 times radius of the core. According to this invention, favorable to the emitter will be the ratio close to 1, namely w=D/2, where D is the core diameter, or, the equivalent core diameter.

The emitter is used as a substitute for a classic electromagnetic antenna, whereas, on the other side of the contactless NFC or RFID coupling, signal is received and transmitted by standard NFC or RFID receiving means. The emitter has a task to create an intensive and homogenous magnetic field. In the case of using the emitter on microSD card or SIM card (subscriber identity module), the core cross-section will be smaller (for example the parameter of the core height), of less than 1 mm. In the case of using the emitter on microSD card, the core length is more than 7 times the smaller parameter of the core cross-section. The core length does not usually exceed 15 mm. In the case of using the emitter on nanoSIM card, the thickness of the emitter is smaller than 0.65 mm, and its length does not exceed 12 mm. The emitter will be used, in particular, to create an additional contactless communication channel. The emitter of this invention also creates the electric field, however, this, on the receiving device's side, is not a signal carrier; it is just the minor field component, which does not make an important contribution to penetrate through the shielding of the host device. At miniaturizing antenna with the core thickness below 1 mm, technical problems arise that cannot be solved just by proportional sizing of commonly known larger antennas structures. First of all, the usage of threads that are parallel to the carrier surface axis, according to this invention, becomes evident by the fact that the thread diameter will significantly reduce, which is contrary to the general demand to increase antenna range, according RFID HANDBOOK, Klaus Finkenzeller, 2010.

The core is oblong in longitudinal direction, in order that the core ends were placed the farthest away from each other within the available room on the surface. The core can be curved but the best results are achieved with a direct rod core, when the magnetic field lines enclose outside the emitter in the longest path and, therefore, have an effort to leak out of the shielded space. The ferrite of the core should have a relative permeability preset so that the inductance of the emitter was from 600 nH to 1200 nH, preferably close to the 750 nH. Taking account of this criterion, the ferrite core can have permeability in the range of 30 to 300. The core permeability will be set according to the technological possibilities of maximum permitted magnetic saturation and the core cross-section dimensional options. The ferrite shall mean any material that amplifies the magnetic field characteristics and attributes.

Essential is, that the threads shall be winded up tightly next to each other in order to prevent magnetic field emission from the core outside of the core ends. The thread wires form the shielding of the core. The wires of adjacent threads prevent creation of eddy magnetic field of the wire that is between the adjacent wires. Between neighboring threads, substantially, there is just a gap in the form of wire insulation thickness. A set of metal coils creates a core shielding cover, which directs the magnetic field flow.

To achieve a condition, when the magnetic field is leaking out of the emitter even through slight gaps between the shielding elements in the host device, the magnetic field in the core needs to be as homogeneous as possible, and at the same time has the greatest intensity at a small core cross-section. The requirement of homogeneity relates to the finding that at small emitter sizes, the unequal magnetic field intensity in the core shows big losses. We require the high magnetic field intensity in order to achieve the high penetrability of magnetic field across the environment.

Both requirements meet best in configuration where the effective width w of one thread corresponds to the core radius at a circular core cross-section. The effective width w of one thread is a parameter, in which a thread wire reflects the length of the core. The wire can have a different cross-section therefore the effective width w of one thread can be different from the real wire width. In the most common case, when the thread wire is of a ring or simple flat shape, but not interlaced, the effective width w of the thread, substantially, will be equal to the wire width. When using a flat wire so that the part of one-thread wire is covered with an edge of the adjacent wire, the effective wire width w will be regarded the width without the edge, which has already covered the adjacent wire. Basically, it will be the part of that wire width, which will in flat wire contact the core. In a dense, tight coil, the effective width w of one-thread wires will be identical to a thread pitch.

A demand to match the effective width w to the radius of the core, or the equivalent radius of the core, should be understood that the effective width w is substantially equal to the core radius. At small total cross-sectional parameters of the core, even a small technology deviation causes the departure from that rule, while still reaching benefits, or at least sufficiently useful effect of that principle. Under meeting the dimensional relationship condition is, therefore, necessary to consider a situation, when the effective width w of the thread is in the range from 0.6 to 1.4 times the radius of the core, or the equivalent radius of the core. In the extent of ratio from 0.6 to 1.4, a loss of maximum magnetic power is of 10%. Even with a relatively large ratio range (0.25 to 1.75) is achieved sufficiently strong and favorable result, whereas the prior art includes the different order ratios of effective width and the core radius (less than 0.001 to 0.1).

Respecting dimensional relationship, we create the emitter with the effect of a magnetic gun, when the magnetic field is emitted intensively from a small cross-sectional area of the miniature core.

The term equivalent radius of non-circular cross-section means the radius, which a ring should have if it had the same area as the cross-sectional shape of the specific non-circular cross-section. The equivalent radius of the non-circular cross-section is therefore the equivalent radius across the board. For example, at an exact square cross-section of the core with a side "a" the equivalent radius is $r_e=a/\sqrt{\pi}$. At a rectangular cross-section of parameters "a", "b", without rounded edges, the equivalent radius is $r_e=\sqrt{(a \cdot b/\pi)}$. The core can have a square cross-section, rectangular, circular or elliptical, or can be formed by combining mentioned shapes. The most common shape of the core is designed to take advantage of the space, usually the core will have the circular cross-section shape, or elliptical shape, or a cross-section is at least in partially rectangular shape, especially square or oblong, preferably with curved corners.

Being simple, the emitter will be made in the way that the wire of width w is winded along the whole length of the core l and has N=l/w threads. The source U has an internal impedance Z. The emitter Ls has a series loss resistance Rs and is connected to the source U via an adjustment member C1//C2, as shown in FIG. 1, so that to be perfectly adapted on a working frequency f. FIG. 1 shows the transformation of a series circuit Ls+Rs to parallel Lp//Rp, where Rp=(1+Q²)Rs and $$Lp = \left(1 + \frac{1}{Q^2}\right) Ls.$$

Providing that the quality of the resonance circuit Q>>1, then the relationships can be simplified to the pattern L=Ls and Rp=Q² Rs. The source power to cover the loss is then $$P_U = \frac{U^2}{Re(Z)}.$$

Inductance Ls can be adjusted if Rs is smaller than the real part Re(Z). In that situation, the current $I_L$ flowing with the inductance Ls is $$I_L = \sqrt{\frac{P_U}{R_p}}$$

The magnetic field in the middle of the emitter is then $$H = \frac{NI_L}{l}$$

where N is the number of threads. Relation will be further edited to $$H = \sqrt{\frac{P_U}{lw R_{1N}}}$$

where $R_{1N}$ is a standardized loss of winding on one thread and has character $$R_{1N} = \alpha \cdot c^{-b \cdot w}|_r$$

FIG. 2, then, shows the dependence Rs to the coil width w divided by the core diameter. In FIG. 2, is marked the point C corresponding to the ratio w/D=0.5. The maximum coil width is wmax=2πD. At bigger width a mutual overlapping of wires would occur. The rest part of the graph covers the area from N=2.5 threads to N=55 threads.

Graph in FIG. 3 shows the dependence of the magnetic field intensity in the centre of the emitter. Maximum value (point A in the graph) of the magnetic field is in a case if w=0.5·D, so when the effective width w of the thread corresponds to the radius of the emitter's core. To the left of point B (very thin wire width), is resistance Rs greater than internal impedance Re(Z) is, and the source is not able to deliver the required power to the load, which results in a significant decrease in the magnetic field intensity. Point B is interesting also because the capacity C2=0, the resulting resonant circuit is simplified to series resonant circuit, as shown in FIG. 4. Such a simplified circuit, however, does not provide the maximum magnetic power. Magnetic field to the right of the point A decreases, because the coil, whose width w increases, forms still greater angle with the axis of the emitter's core.

Based on the Biot-Savart law, vector Hx is count up as the vector product of the current $I_L$ and the vector r, which in our case is an axis of the emitter's core. It integrates across the whole curve x of winding (a spiral with pitch w)

$$Hx = \frac{I}{4\pi} \int_x \frac{dx \times r}{r^3} = \frac{I}{4\pi} \int_x \frac{dx \cos \alpha}{r^2}$$

Consequently, the finding shows that in a very wide coil, the angle α starts strongly affect the magnetic field intensity with the coefficient cos α. On the contrary, to the left of point A, impact of the angle α is negligible, but starting to show the significant loss of Rs, as shown in FIG. 2. Since the value of w=D/2, the loss Rs starts significantly increase (point C). The graph shows that the optimal emitter inductance is approximately at L=750 nH. Under the given parameters of the emitter it is necessary to choose such a permeability μ that at w=D/2, inductance shall just be L=750 nH.

When using a single-stage coiled wire of a classical circular cross-section, there occurs a problem with a bending radius of a wire, since the effective width w of the wire, now equal to the wire diameter, shall be substantially equal to the core radius, for instance a circular core. Allowable minimum wire bending is usually determined more than twice the bending radius. If then we have only one millimeter of a build height to place the emitter, the maximum height of the core would be less than half a millimeter, which causes technological problems and complications with a winding of relatively thick wire onto a breakable and small core. Problems with winding are caused by the ratio of the effective width to the core radius, according to this invention, as the wire should be relatively wide and, therefore, thick, in comparison with the core.

In order to make better use of an available height of the room and still following the basic rule of the present invention (i.e. the dimensional relationship between the effective width w of the thread and the core radius), it was invented a solution involving the use of a flat wire. Its width after winding across the core corresponds to the radius of the core. The flat wire is being winded on the core easier, and, in the cross-sectional height, it does not take up much space. The given space is then possible to make better use for the emitter's core. The flat wire has yet sufficiently low electrical resistance. The flat wire will have the width exceeding twice the height of the wire, or the wire thickness.

Furthermore, it was invented that at a favorable configuration, the flat wire can be replaced by a system of at least two adjacent coiled wires, but they together still make only one thread. These wires are electrically connected as well. If, for instance, we want to replace the flat wire with the original aspect ratio 1:3, we use for replacing such a flat wire three wires of uniform circular cross-section, winded up next to each other, as if this was a three-stage thread. If we replace the flat wire with the original cross-section 1:8, we use 8 wires of circular cross-section placed next to each other, as if, in mechanical terms, this was an eight-stage thread. Wires in one multi-stage thread would not have to be insulated between each other, since these wires will have the coil ends electrically linked, but, due to technological simplicity, the same insulated wire can be used for all wires of the specific thread. In other arrangement, only marginal wires of one tread can be electrically insulated, internally placed wires do not need to have insulation.

The effort to achieve the homogeneous high intensity magnetic field, which will emit from the distant core ends, leads to a number of contradictory requirements. It is advisable to use as few threads as possible, but with decreasing number of threads is reduced also the length of the core, which is shielded by these threads, with decreasing number of threads also increases the current load, which is needed for signal emission, the current intensity is, however, limited by the host device elements. Using the flat wire, or, using the multi-stage one-thread wire, held parallel, properly eliminates this conflicting clash of the demands.

Emitter in miniature size can be placed on the PCB board inside a mobile communication device or can be placed within the removable memory card's body, or can be placed on a SIM card, or can be placed on a battery, or can be placed in combination of the above.

Using the emitter according to the invention directly on the PCB board of a mobile communication device (especially mobile phone), the emitter provides advantage particularly in that the emitter used as an antenna has miniature size, and it can be placed almost anywhere on the board. Up to now, NFC antennas were designed special for each new mobile phone model, whereas the antenna loops encircled the larger surface area on the PCB board or around the PCB board. Until now, one manufacturer of several mobile phone models had to use several types of NFC antennas. When using the emitter of the present invention, even when used directly on the PCB board, it will be sufficient to use a miniature emitter.

In the case of using the emitter on the removable memory card, such a card is designed for insertion into the expansion slot of a mobile communication device. In this case, the emitter on the removable memory card substrate is placed in such a way that the axis of the antenna core is oriented predominantly parallel to the surface of the removable card's body and the emitter is located on the marginal parts of the removable memory card's body out of the contact interface zone. Advantageous is if the emitter is located along the edge that is opposite the edge with contact interface zone of the removable memory card.

Favorable is when the length of the core, that is the core parameter in direction of the winding axis, is as long as possible within dimensional possibilities of the card, this enables the longest magnetic field lines and only a minor part of the magnetic flow is closed in a short path. When placing the emitter into the removable card's body, the core height will be up to 1 mm, the width up to 5 mm and the length up to 15 mm. In a favorable orientation out of the zone of contacts, the core will have a rectangular cross-section with the height up to 0.7 mm, the width up to 1 mm and the length up to 11 mm.

In the case of using the emitter on a SIM card, for emitter placement is available larger space. SIM card is larger than a microSD card and also does not have such a high penetration of electronic components outside the chip in the contact field. The emitter can be placed on a SIM card in different positions and rotations. When placing the emitter on a microSIM card or a nanoSIM card, there are considerably more limited spatial options than at a normal SIM card. For such an emitter location has been invented the solution, when the emitter on the removable card cooperates with the amplifier (booster), which is placed in the slot, or in the immediate vicinity of the slot, in which the card is inserted. The amplifying element is then available to a larger space, or larger area for building, such as space, or the emitter surface on the removable card itself. The term amplifying element includes also the element that does not increase the energy level of the magnetic field, but the emitted flow from the emitter for instance only directionally directs or homogenize.

The amplifying element can take the form of a ferromagnetic or ferrite foil or a board, can take the form of a resonance circuit or the like. In principle, it will be appropriate that the amplifying element does not require new additional contacts for connecting the slot with the substrate, for instance for power supply and the like. Then, it is possible to design a new slot to enhance its functionality without changing the design of the surrounding (PCB board, holder and the like).

The mentioned configuration of an emitter and the amplifying element in the slot will be well usable in manufacturing practice, because slots are externally supplied components, externally manufactured subsystem, which after designing has reserved an appropriate space in the host device. Into the unmodified space, we can later place a slot that is supplemented with the amplifying element. The principle of cooperation between the emitter on a removable card and the amplifying element located in a host device can also be used more generally, when the emitter is located in a removable element, as a card, jack, battery, other accessories, and the amplifying element is placed in the slot, connector, removable cover, which is in the range of the emitter's magnetic field.

When using the emitter in a mobile phone battery (accumulator), available are more placement options and rotations of the emitter's core. In principal, more emitters on different places with different mutual orientation can be placed in one battery. Activation of a particular emitter can be chosen according to the results of successive transmissions in a given mobile phone.

Signal transmitted from the magnetic field emitter according to this invention is received by a standard receiving means in a given frequency band. For instance, if the emitter is specified for NFC transmission between a mobile phone and a POS terminal reader, the antenna on the mobile phone's side will take the form of the magnetic field emitter with a ferrite core, but on the POS terminal NFC reader's side a common receiving antenna will be located. Just the conformity with the existing standard devices is important, in order there was no need to change the hardware that is widely spread on the side of POS terminals. Hardware changing on the mobile phone's side happens just by inserting the removable memory card (particularly microSD format) in addition to existing expansion slot of the mobile phone, or by inserting a new SIM card, or a new battery. The expansion slot of the mobile communication device is a slot for a card that does not affect the basic communication function of the device, then, it is particularly, but not exclusively, the slot for the removable memory card of microSD format.

From the technological point of view, it will be preferable if the core is formed a ferrite rod positioned on the non-conductive substrate. The non-conductive substrate will have a width corresponding to the width of the core and a length at least equal to the length of the core. The thread wires are winded up across the ferrite rod and also across the non-conductive substrate, thereby, a wire coil mechanically upholds the core with the non-conductive substrate. The non-conductive substrate can have on both ends connecting pads to connect coil wires and to connect the antenna with the removable memory card's body. On connecting pads, the multi-stage coil wires are connected to each, and also these emitter contacts are interconnected with conductive circuits of the host device.

Magnetic field generated in the emitter according to this invention has the ability to penetrate though small gaps in spatial structure of a mobile communication device. Flat gaps for example between a card and a card slot, then between a battery housing and an adjacent mobile phone's body, are sufficient to allow the magnetic field penetrate out of the mobile phone body. The magnetic field emitted out of the emitter will be on the opposite side of the communication channel received by a common antenna, for example in the form of a POS terminal. In practice, the emitter will be located mainly inside the mobile phone, which has in unfavorable configuration metal coverings. The magnetic field lines come out through small gaps between the covers, therefore, into the space where a NFC reader is located. Coverings are basically always detachable, often for being able to remove the battery from under the cover, making the gap between their parts. Those are sufficient to ensure that the magnetic field with a high intensity penetrates out from the emitter according to this invention.

Emitter resonant characteristics can be achieved by adjusting the position and parameters of the coil wire so that the coil itself has an adequate capacity, or, the whole system of all coil wires has an adequate capacity, possibly including electromagnetic environment linkage.

The emitter can be designed in the way that it is tuned appropriately under the impact of different surroundings. If it is located in close proximity to electrically conductive materials, the emitter inductance is reduced. This feature is utilized for automatic control of emitted power depending on the surroundings, in which the emitter is located. This will increase the versatility of applying the emitter, when distributed it is no need to consider the impact of different types of mobile phones. The emitter will be tuned for instance to the resonance of 15 MHz just when it is in a metal cover. Under environmental impact, the antenna inductance is stabilized, reduced to 1 µH. However, if it is placed outside the housing, the inductance will increases to 1.3 µH and the resonance will move to 12 MHz. Since the emitter emits power having frequency of 14.4 MHz, the maximum power is emitted precisely when the resonance is close to that value, because its internal resistance is then the smallest. However, if the emitter is placed under the plastic covering, the resonance will move downwards to 12 MHz and the internal resistance at frequency of 14.4 MHz will increase. The emitter will be in a preferable configuration designed and constructed so that the frequency and/or inductance and/or internal resistance are preset to the maximum transmit power in the most unfavorable possible shielding, e.g. in full covering. Then, the reducing rate of shielding, in relationship with the environment, will reduce the transmit power at the same input energizing, by reason that the adjacent shielding elements affect the frequency an/or inductance and/or internal resistance of the emitter. Simply, for transmitting by means of the emitter, we will intentionally use also the surrounded metal parts, although their absence causes a decrease in transmission power, but the emitter will be set so that even at zero shielding, the emitter transmission power exceeds the minimum performance for receiving by standard NFC or RFID means.

The magnetic field emitter according to this invention shall, in principle, be used to transmit the signal from the body of a removable memory card or the body of a SIM card, from a PSB board or a battery. In the reverse direction of communication, when the signal is received onto the removable memory card, usually, it is not a problem with the electromagnetic field intensity, whereas, in this direction, the transmitting antennas are not dimensionally restricted. In principle, it is, particularly, no need to optimize the transfer path towards the emitter, which will serve as a receiving antenna. In other arrangement, the emitter can be complemented a classical coil, a separate NFC antenna for receiving a signal towards the removable card.

Maximum effective current from the output driver can be in the range of 0.1-0.2 Arms, when the maximum permissible current load is based on the standard card interface. The output driver is part of the power amplifier output stage. The current in the coil wire does not exceed the value of 0.8 Arms. The output resistance of the output driver in such a setting and power supply on microSD card can be less than 10 Ohm. The specific impedance value may vary according to the preset ratio of voltage, current and power.

When reducing the core cross-section, we attempt to achieve the highest possible magnetic field intensity in the core. This brings increased demands on the core material. An appropriate way to increase the ferrite core efficiency is the concentration of the frequency band to the narrowest frequency spectrum as possible. A frequency spectrum design is yet largely contingent by normal modulation principle, basically, is determined by the contactless communication standard, according to which the transmitted data are modulated into the subcarrier frequency, which is combined with the basic, carrier signal. The emitter, according to this invention, has shown to be particularly advantageous to the new principle of modulation, when the frequency spectrum can be tuned, tuned to a single frequency. The emitter is narrowly tuned to transmission frequency, regardless of subcarrier frequency. The frequency spectrum can, therefore, have a sharp peak.

The emitter and the receiver are connected transformer, the receiver transmits a carrier signal at a first frequency, on the emitter's side, are data modulated and transmitted to the receiver, the receiver analyzes the signal, while the signal appears in the form of a carrier signal at a first frequency and modulated subcarrier frequency with data at second frequency with respect to the carrier frequency. In the receiver, the carrier signal is separated from the signal on the antenna output and transmitted data are demodulated. The subject matter of a new modulation in data transmission from the emitter to the receiver, in particular, means that the receiver frequency and emitter frequency are different and the difference in frequency corresponds to the subcarrier frequency. Signal, which is received and demodulated on the receiver's side, is formed combining the transmitted carrier signal and modulated data transmitted by the emitter, where this combination is detected and received at the receiver antenna. This difference in frequency is not caused by an inaccuracy, but is intentional and significant. The difference in frequency is in the extent of the subcarrier frequency, to the usage of which the receiver is preset.

When using a transformer connection in transponder, the frequency signal does not have to be actively transmitted; it is sufficient if the induction circuit of the transponder antenna is short-circuited on a needed frequency. These changes on the transponder's side can be measured on the receiver antenna output.

The change in the transmitting frequency of the emitter, as opposed to the receiver carrier frequency, is chosen in such a way, so there would not even be necessary to change the evaluation method of the received signal on the side of the receiver nor it would be necessary to change the connection (arrangement) of the receiver. The change in the transmitting frequency can be preset to both sides of the carrier frequency value, which means that the transmitting frequency can be lower or higher than the value of the receiver carrier frequency.

Due to the small mutual distance, a transformer connection is created in the antenna system that is formed by the receiver's antenna and the emitter with mutual induction. During data transmission, the receiver sends its carrier frequency to the antenna, the emitter sends a modulated signal with a different frequency to its antenna and then the signals of different frequencies are combined in the mutual antenna system.

The output from the receiver's antenna is analyzed in the receiver. This output on the receiver's antenna has the same character as if the emitter transmitted on the carrier frequency with a modulation of subcarrier signal while using load modulation. Then, from the result of the frequency combining, the signal carrier is transponded in the receiver and the result obtained corresponds to the modulated subcarrier signal, even though the emitter does not physically use the subcarrier signal. The data transmitted can be received from this signal through demodulation, even when in reality they were modulated directly into the emitter's transmission frequency. The data procession method is not changed by this kind of configuration for the receiver, which is an important factor, since it enables using existing receivers with new emitters. The reverse data flow direction can be the same as it was until now.

In case the receiver, as described by this invention, transmits its signal outside the mutual induction it has with the receiver's antenna, the transmitted signal will not correspond to the usage of subcarrier frequency, since the emitter does not transmit it and the receiver that would expect a standard signal structure would not be able to evaluate this kind of signal. Only when mutual induction is created, the physical effect of merging different frequencies occurs. The difference between these frequencies is deliberately set to the extent of expected subcarrier frequency. The received signal is processed by the receiver in the same way, as it is done in up until now existing solutions. The significant contribution of this invention is, that it does not require changes on the side of the existing receiver. The emitter will be located for instance in the mobile phone. During realization of cashless payment, the mobile phone with the emitter on the memory card is approached to the receiver, which is within the POS terminal reader. The signal is generated in the card and is modulated with the frequency that is different from the frequency generated by the receiver as a carrier frequency. The signal from the receiver is combined with the signal from the emitter and forms a signal in the form of combined signal, which appears in the receiver to be a signal that is in accordance with existing structure. The receiver, reader then processes a merged, combined signal as is common in existing processes.

It is suitable if the transmitted data are modulated directly by a change in phase of the emitter's frequency $\phi=0°$, or $\phi=180°$. It is sufficient if, at the modulation in the emitter, the phase of the frequency transmitted is changed during modulation once per basic time unit—etu. In this way a smaller number of phase changes is sufficient, a situation, which lowers the requirements on the modulation management on the emitter's side and which also lowers noise.

The method described is capable of operation in transformer connection between the emitter and the receiver, the advantages of this method primarily appear in weak transformer connection with the transformer connection coefficient $k=0.2$-$0.001$.

From the point of view of using existing receivers, it is suitable if the carrier signal $f_r$ has the 13.56 MHz±7 kHz frequency. The difference between the signal carrier frequency and the emitter's frequency is formed entirely by the carrier frequency, preferably by $\frac{1}{16}$ of the carrier frequency, which corresponds to the 847 kHz. This relationship between the frequencies is advantageous from the hardware point of view, where it is possible to use existing electronic elements for division of frequencies and is also advantageous from the point of view of conformity with existing standards. The frequency generated by the emitter $f_t$ will be of the 13.56 MHz+847 kHz=14.4075 MHz value, with the same tolerance of ±7 kHz as well.

The signal detected on the receiver's side corresponds to the situation during common load modulation of the carrier frequency. However, in present solutions and methods, the antenna load would have to be changed every half-wave of the subcarrier signal—which in case of carrier frequency being 13.56 MHz, would be approximately every 0.6 μs. In the solution and method according to this invention it is sufficient if the change is done only once per 1 etu, so approximately it would be every 9.3 μs. Smaller bandwidth of changes generates less noise with the value NoisePower=10·log (16)=12 dB.

The data transmission method according to this invention enables to tune the emitter's antenna to a narrow transmission frequency, whereas it is not necessary to consider the antenna's emission characteristics for subcarrier frequency. In reality the emitter does not use subcarrier frequency; the subcarrier frequency is present only during the frequency interference. The receiver expects reception of the subcarrier frequency; in configurations according to ISO 14443, the absence of the subcarrier signal on the receiver's antenna output would prevent any kind of communication from taking place.

The method described will find wide application during transmissions in which the transmitter is located on or in the mobile communication device, preferably on the card, which is (in a removable manner) placed into the mobile communication device's slot (SD card, microSD card, SIM card, microSIM, nanoSIM card). In that being the case it is not practically possible to increase the transformer connection coefficient and the improvement of transmission characteristics is the main advantage of the method described in this invention. The emitter is, as described in the invention, tuned to a narrow frequency characteristic, which corresponds to the transmitting frequency. In case of reverse data course a different frequency is used, which does not create any transmission difficulties on the emitter's/transponder's side, since the reader transmit with a considerably higher energy and even with a higher frequency spectrum. The reader can be for example a communication element of the POS terminal.

For realizing the method of modulation the emitter according to this invention, the connection (arrangement) comprising of the emitter, modulation element, demodulation element and an electromagnetic wave generator with a frequency that is different from the receiver's frequency, can be used. The usage of the electromagnetic wave generator in the connection is not common in a transformer connection of receiver and transmitter antenna inductions, since up till now a load modulation on the side of the transmitter has been used. In our connection the generator will be the oscillator of electromagnetic waves and the transmission data are connected to the oscillator's input.

Since the emitter should be able to operate even during the reverse data flow, the emitter's demodulation element will be connected to the turning of the induction heading towards sensor resistor. To eliminate voltage peaks at the entrance into the demodulation element, the demodulation element will be connected via inductor. The turning reduces tension and improves impedance circuit. The power supply of the emitter's circuit can be ensured from the received electromagnetic field, in which case the transmitter can be considered to be a passive element; however the power supply can be secured also by its own power source. In case of implementation of the emitter into the memory card in the mobile phone according to this solution, the transmitter can be supplied with energy over the card's interface.

The frequency values mentioned here are suitable settings and corresponding to existing norms and standards, but it is possible to apply the described way of frequency combination even on completely different frequency values, since the creation of subcarrier signal in frequency combiner is based on generally valid manifestations of wave.

The emitter on the card according to the present invention has excellent transmission properties in slots of different mobile communication device, and even in the slots positioned under a battery. The measurement has shown that the mobile phone with the removable memory card with the emitter, according to the present invention, is capable to create a reliable NFC communication channel, whereas the directional orientation of a mobile phone to a NFC reader is not limiting. The impact of different mobile phone structures on reliability of additionally created contactless channel is suppressed.

The connection of emitter and method of data transmission modulation described can be used even in other transmission solutions, e.g. in galvanic separated data transmission from the sensors, during data transmission from moving, oscillating elements and similar. The connection (arrangement) and method according to this invention enables to optimize transmission systems in data transmission that is used in household equipment, electrical appliances, medicine, car technique and similar. The invention simplifies the modulation of the signal on the part of the emitter, it lowers the noise and allows for a very narrow and effective tuning of the emitter.

These effects in conjunction with the new structural configuration of emitter (ratio of effective width of one thread to the emitter core radius) synergistically improve transmission characteristics even when the transformer connection is weak, which creates the prerequisite for quality data transmission even from shielded surroundings.

BRIEF DESCRIPTION OF DRAWNINGS

The invention is further explained with FIGS. 1 to 26. The used display scale and the ratio of individual components may not correspond to description in the examples and the scales and proportions cannot be interpreted as narrowing the scope of protection.

FIG. 1 schematically depicts the transformation of the series LR circuit to parallel circuit.

FIG. 2 includes a graph of loss in the emitter's coils depending on the ratio of the wire width to the diameter of the core.

In FIG. 3 is a graph expressing the size of the magnetic field at the centre of the emitter depending on the ratio of the winding width to the diameter of the core.

In FIG. 4 is the series resonant circuit, to which simplifies the resulting resonant circuit at point B of the graph according to FIG. 3.

In FIG. 5 is an axonometric view of the emitter with the flat wire cross-section. The gaps between the wire coils are shown only to increase transparency in fact the winding is arranged tightly next to each other.

In FIG. 6 is a cross-section of the core and the flat wire at a single coil. Again, between the coils one another and between the coils and the core are shown gaps to increase transparency, in fact, the winding is arranged tightly next to each other and just on the core without gaps.

FIG. 7 depicts the cross-sectional area of the flat wire with overlapping edges. Between the coils one another, and between the coils and the core are shown gaps to increase transparency, in fact, the winding is arranged tightly next to each other and just on the core without gaps.

FIG. 8 shows the cross-section of the core with multi-stage wire coil, where the wire of all one-thread stages is same and insulated. Between marginal wires of adjacent threads in FIGS. 8 to 13 is for increasing transparency depicted a gap, which, in fact, by winding does not arise. The gap in the figures is intended to distinguish wires to one-thread groups.

FIG. 9 depicts a cross-section of the core with multi-stage wire coil, where only marginal wires of one coil are insulated. The wires placed inside one group, of one coil are non-insulated.

FIG. 10 shows the wire pitch in the coil on the core with the circular cross-section. In the view, for clarity, only one wire 41 is shown, other wires are shown in cross-section only. The thread pitch is half the diameter of the circular core.

FIG. 11 presents a view of a half of the emitter, where the coil comprises of the flat non-insulated wire, along the edges of which is winded the insulated wire of the circular cross-section.

In FIG. 12 is a view of the end of the emitter's coils at the end of the core with non-conductive substrate, which is soldered on the removable memory card substrate.

Figure 15:
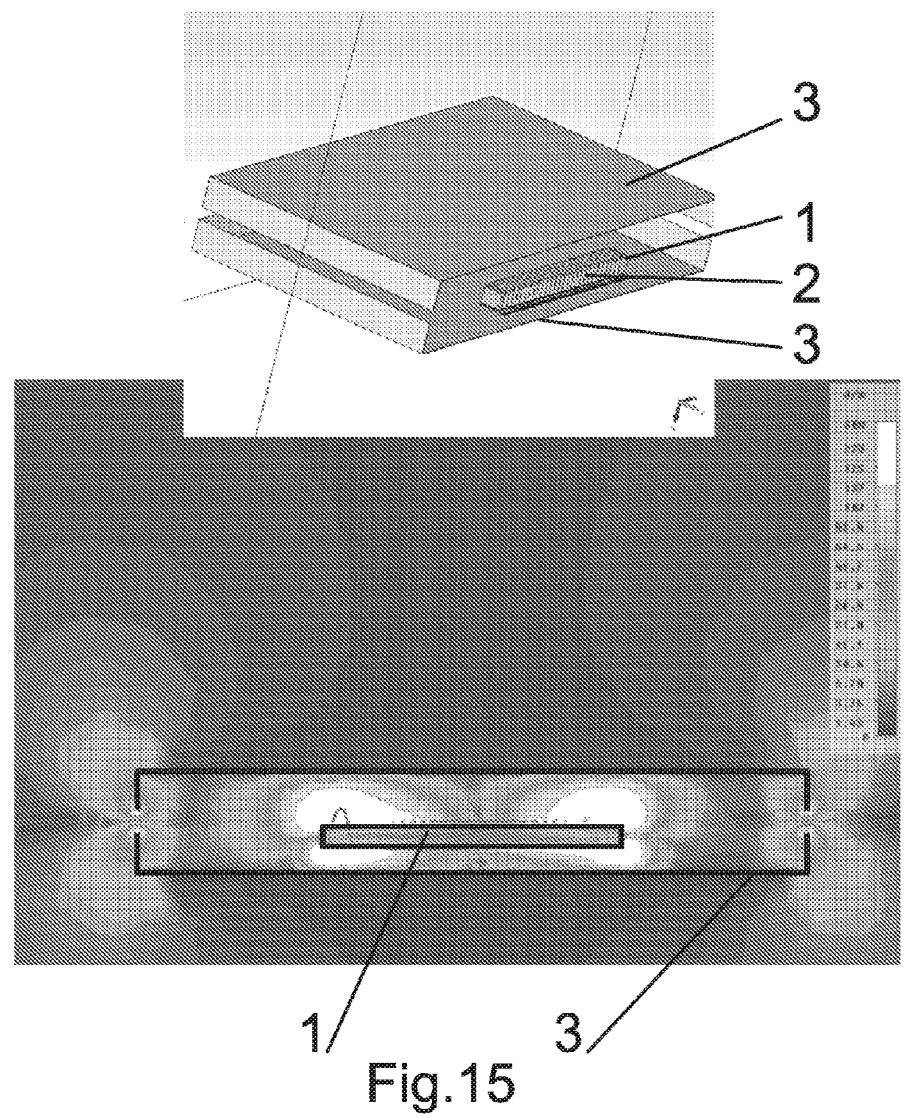

In the FIG. 15 is a magnetic field emission diagram in side perspective, when the emitter is placed on the removable memory card and that is inserted into the mobile phone with metal housings. The emission diagram in horizontal plane shows the magnetic field effort to push through the narrow slit in a metal cover so that the magnetic field lines enclosed.

Figure 16:
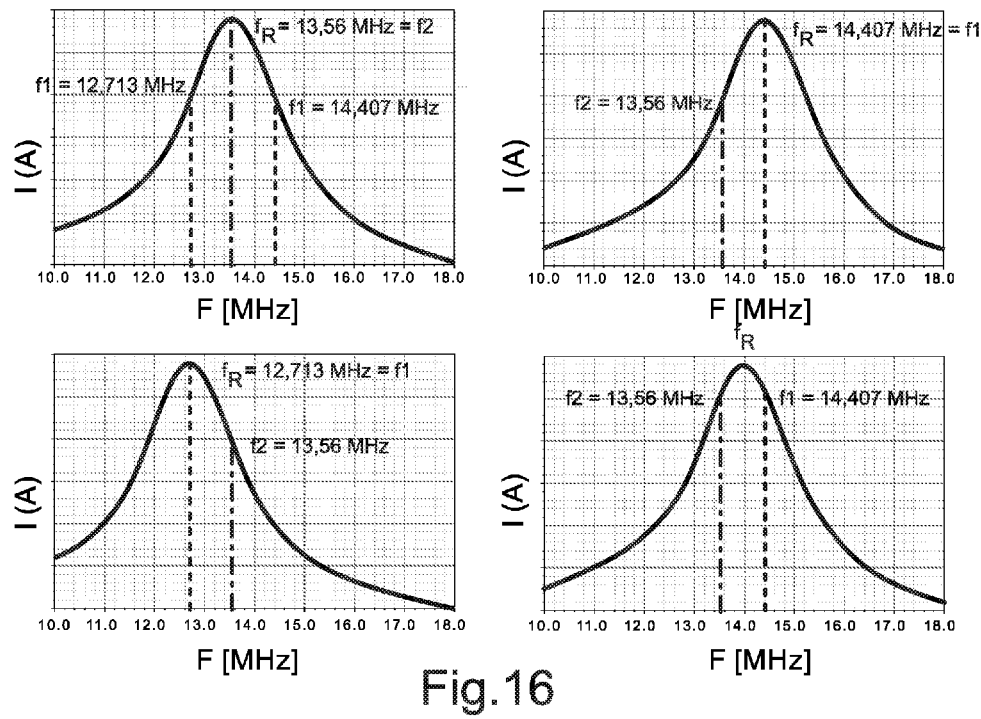

FIG. 16 includes examples of four antenna frequency settings in NFC transmission zone. The resonance curve is marked in a full line. The top of the resonance curve represents the antenna resonance frequency $f_R$ and can coincide with the transmission frequency f1 or with receiving frequency f2, or can form only the top of the curve, which characterizes the usable frequency band. The transmit frequency f1 is carried in dashed line. The receiving frequency f2 is carried in dot-and-dashed line. The axis y shows the input current to the antenna.

Figure 17:
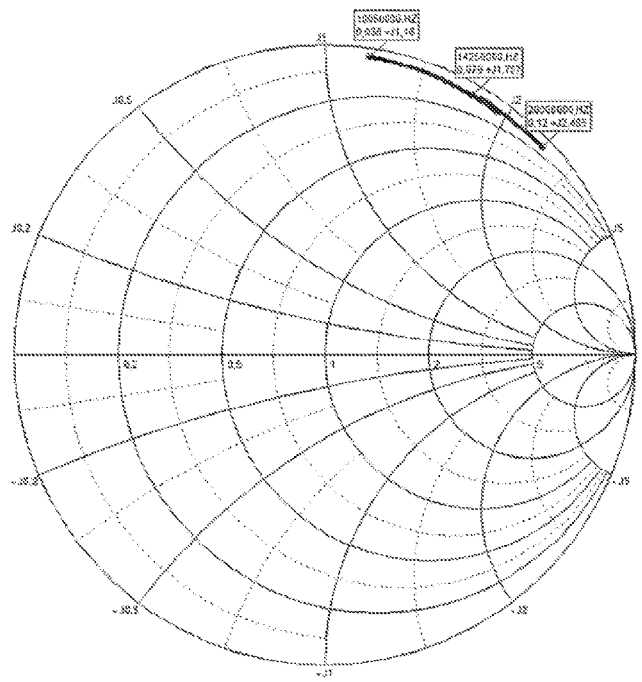

FIG. 17 shows impedance parameters of the emitter.

Figure 18:
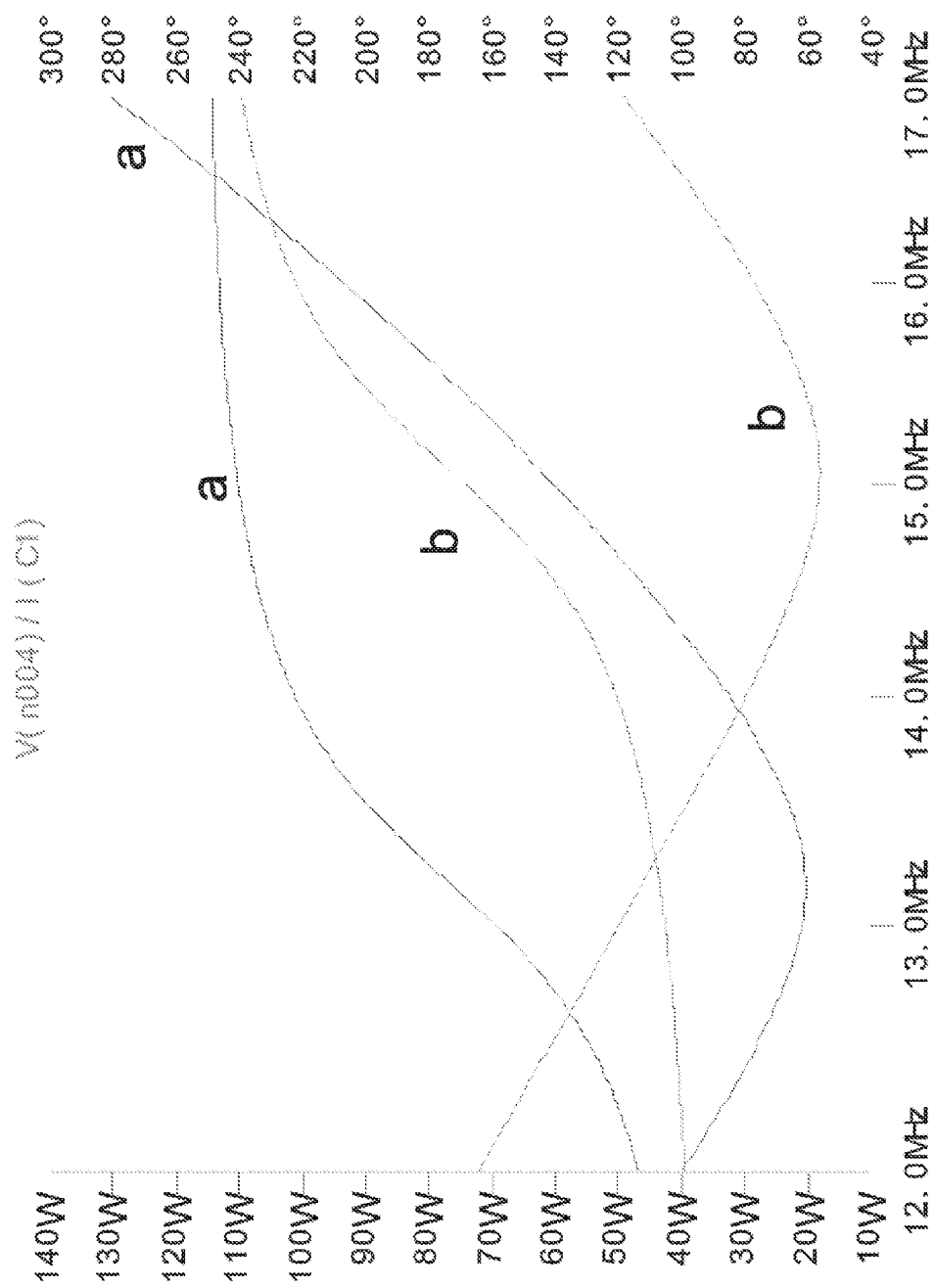

FIG. 18 depicts the automatic tuning of the emitter power, when the emitter impedance varies depending upon the environment. Curve "a" represents the internal resistance of a system with the emitter placed in a plastic housing, curve "b" applies to a system with the emitter placed in a metal housing.

In FIGS. 19 through 22 are shown SIM cards with emitters located differently in the body of the card.

FIG. 23 depicts the location of the emitter directly on the mobile phone PCB board.

In FIG. 24 is shown the location of the emitter in the body of the mobile phone battery.

Figure 25:
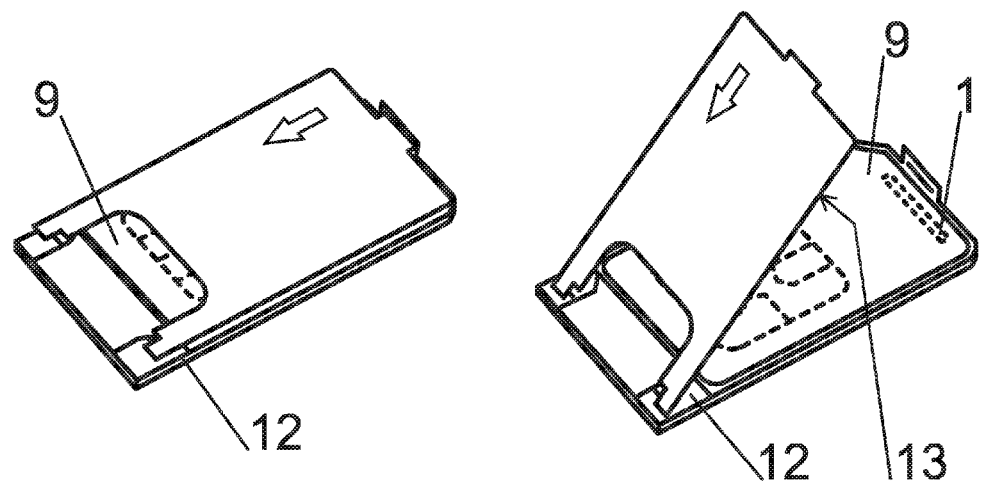
Figure 26:
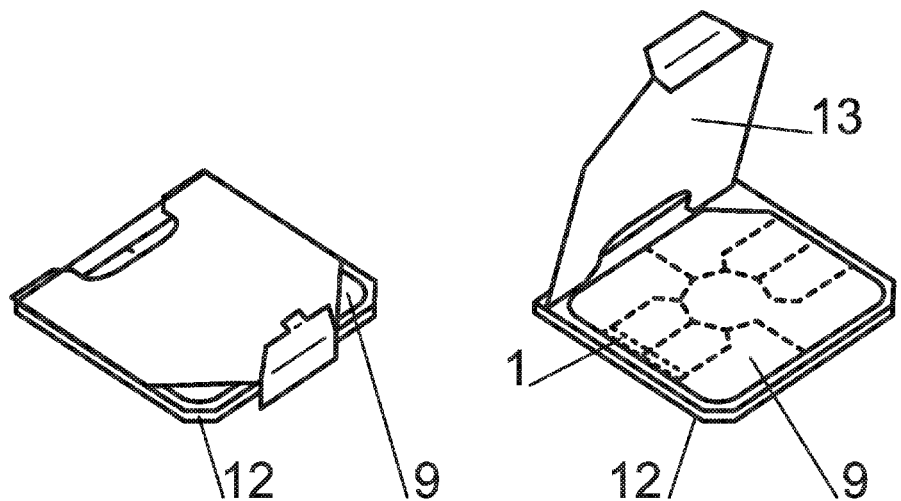

FIGS. 25 and 26 depict the slots of a miniSIM card and a nanoSIM card. Slots are provided with amplifying elements and are shown as being removed from the host device.

EXAMPLES OF INVENTION

Example 1

In this example according to FIGS. 1, 2, 3, 4, 8, 12, 13, 14, 15 to 18 is described a structure of the emitter with a ferrite core 1 of rectangular cross-section. The core 1 has the length of 9 mm and the cross-section 0.8 mm×0.6 mm. To the core 1 is appended a non-conductive substrate 6, which has the width of 0.8 mm and the thickness of 0.04 mm. On the core 1 and also across the non-conductive substrate 6 are winded 21 threads 2 of copper insulated wire placing right next to each other. One thread 2 is made up of six parallel wires 4 with a diameter of 0.05 mm. This will replace the flat conductor of one thread 2 sized 0.3 mm×0.05 mm.

On the non-conductive substrate 6, at the ends, are two connecting pads 7, on which are conductively linked six wires 41, 42, 43, 44, 45, 46. Wires 41, 42, 43, 44, 45, 46 at the ends of the core 1, that is after the last thread 2, draw apart to create bigger space for the tip of an ultrasonic welder. Wires 41, 42, 43, 44, 45, 46 are ultrasonically bonded down, welded to the contacting pads 7.

At the same time, the connecting pads 7 are linked to a contact, with which is whole the emitter's body soldered to the substrate, in this example, to the substrate of the removable memory card 5 of microSD format. The emitter on the removable memory card 5 is located opposite to the zone with card contacts, in this example, preferably right in the part where the card has a small thickening to facilitate easier card removing from the slot 12.

Core 1 with a cross-section of 0.8 mm×0.6 mm has the equivalent radius of 0.391 mm. This is the radius at which the circular core has the same area 0.48 mm$^2$ as is the cross-sectional area of the rectangular core with parameters of 0.8 mm×0.6 mm. With 21 threads per length 9 mm, the effective width w of one thread 2 is about 0.428 mm. The ratio between the equivalent radius and the effective width is 1:1.095, the effective width w of one thread thus corresponds to about 1.1 times the equivalent radius.

The advantage of six parallel wires 4, compared to the flat wire is also the better conductivity on high frequencies. Due to the skin effect of depth $\rho$=17 μm/14 MHz the conductive surface of six circular wires is $\pi/2$ times greater than in a flat wire with the same size, and thus result lower losses. The emitter of this example has at the frequency of 14.4 MHz inductance L=1.3 μH and quality Q=21 in power load of 13 dBm.

The antenna array comprises of an antenna energizer (driver), series parallel resonant system with the magnetic field emitter and a low noise amplifier with high profits (limiter). Driver is designed into bridge connection (H bridge) with output resistance Rout of less than 4 Ohm at bridge supply voltage Vcc=2.7 V. Due to the fact that the switching time of MOSFET transistors is less than 1ns, the higher switching harmonic products need to be filtered by capacity C3. Switching signals of bridge H+ and bridge H− are mutually out of phase by 2.2 ns so that to prevent simultaneous switching of both controlled branches and thus a short-circuit of power supply Vcc to ground.

By the structure described we achieve the effect of the "magnetic gun" with horizontal emission at the ends of the ferrite rod of the core 1. The magnetic gun theory, as defined in this invention, is in that the magnetic field lines cannot leave the ferrite rod of the core 1 earlier than at its ends, and that is because the electrically conductive materials of wires 4 with closer mutual winding are impermeable. And since the magnetic field lines must always be enclosed in to each other, the only place where they can leave the emitter, are the ends of the core 1. In practice, however, it is not possible to make a winding so that there is no air gap between the wires 4 and, therefore, part of the field lines penetrate through wires 4. Excellent emission characteristics of the emitter, which is placed inside the metal shielding, are observed in FIG. 15.

The emitter is located inside a mobile phone that has metal covers. This is visible in FIG. 15 as the shielding cover 3, i.e. the magnetic field flow barrier. The magnetic field lines come out from small gaps between covers, i.e. to the area where NFC reader is placed.

Due to different background location, the emitter detunes, and in the case that it is located in close proximity to electrically conductive materials, the emitter inductance is reduced to 1 μH. This attribute is used for automatic control of emitted power depending on the environment, in which is located. The emitter is tuned to the resonance 15 MHz only if it is in a metal housing (environmental impact reduced the antenna inductance to 1 μH) Metal housing represents the shielding cover 3. However, if placed outside the housing, the inductance is increased to 1.3 μH and the resonance is moved to 12 MHz. Since the emitter power is emitted at the frequency of 14.4 MHz, so the maximum power is remitted precisely when the resonance is close to that value, as its internal resistance is then the smallest, about 20 Ohm. However, if the emitter is placed the under plastic cover, resonance is shifted down to 12 MHz and the internal resistance having the frequency of 14.4 MHz grows to 50 Ohm. Due to this configuration we reach a status that the emitter placed under the metal cover emits the maximum power, while in a situation when it is under plastic cover, emitted power automatically goes down, thereby ensuring that in this case the receiving devices (POS terminals) are not energized with too high signal. This automatic attunement of emitter power when the impedance varies according to the environment is shown in FIG. 18.

Example 2

Figure 1:
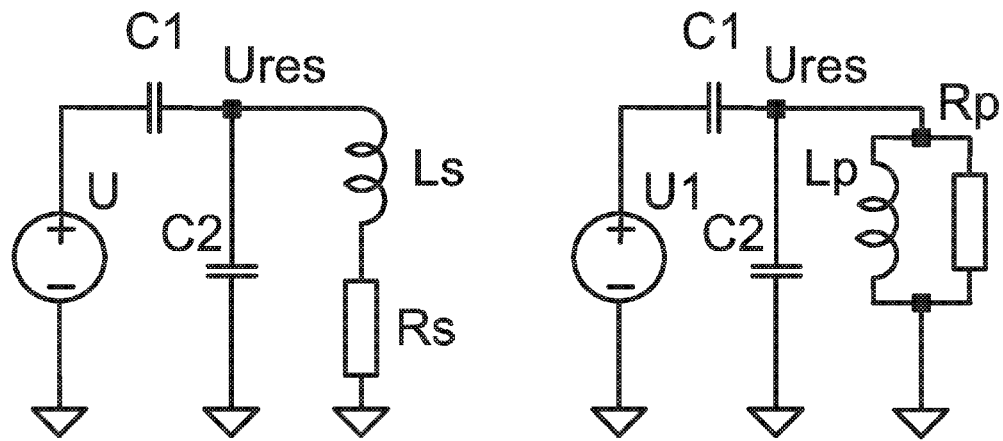
Figure 2:
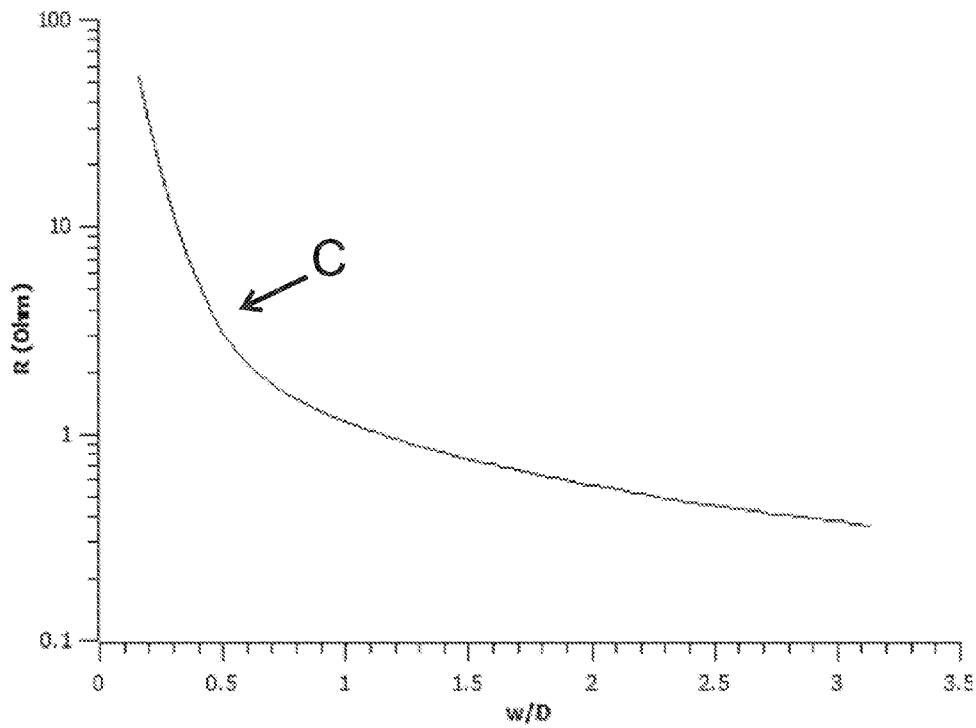
Figure 3:
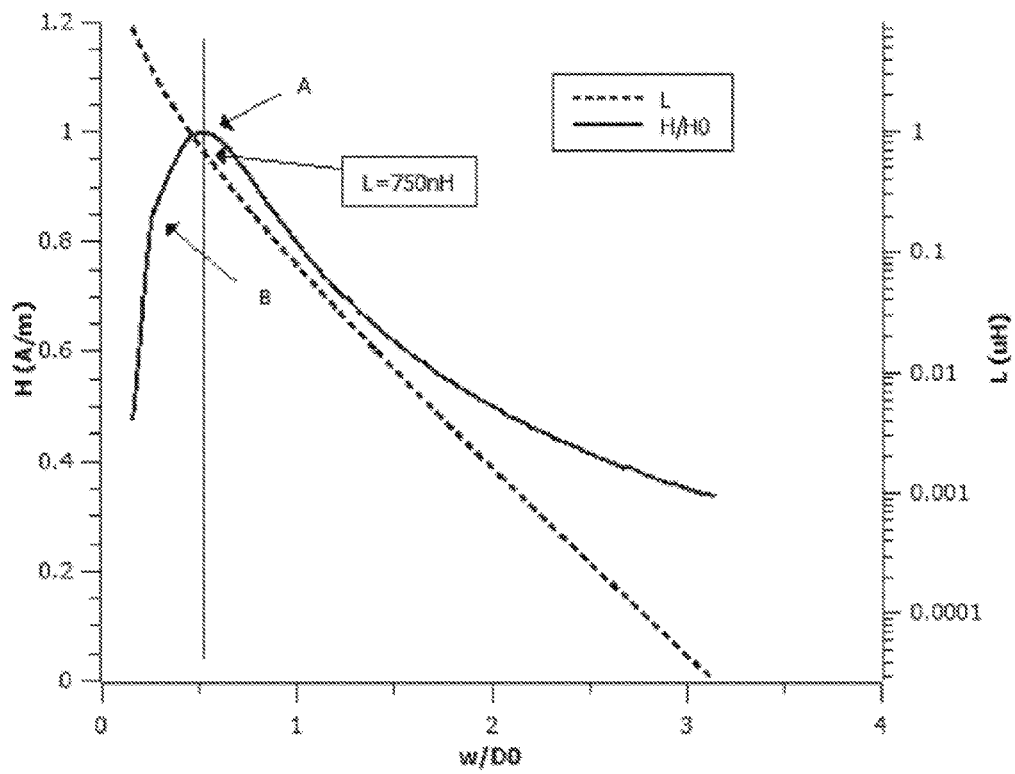
Figure 4:
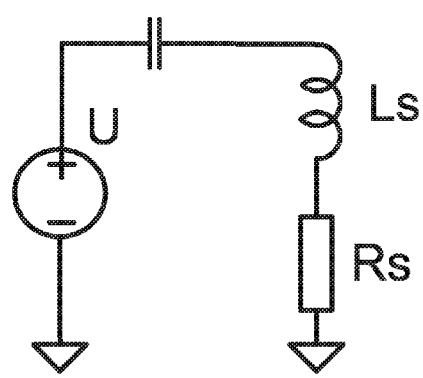
Figure 5:
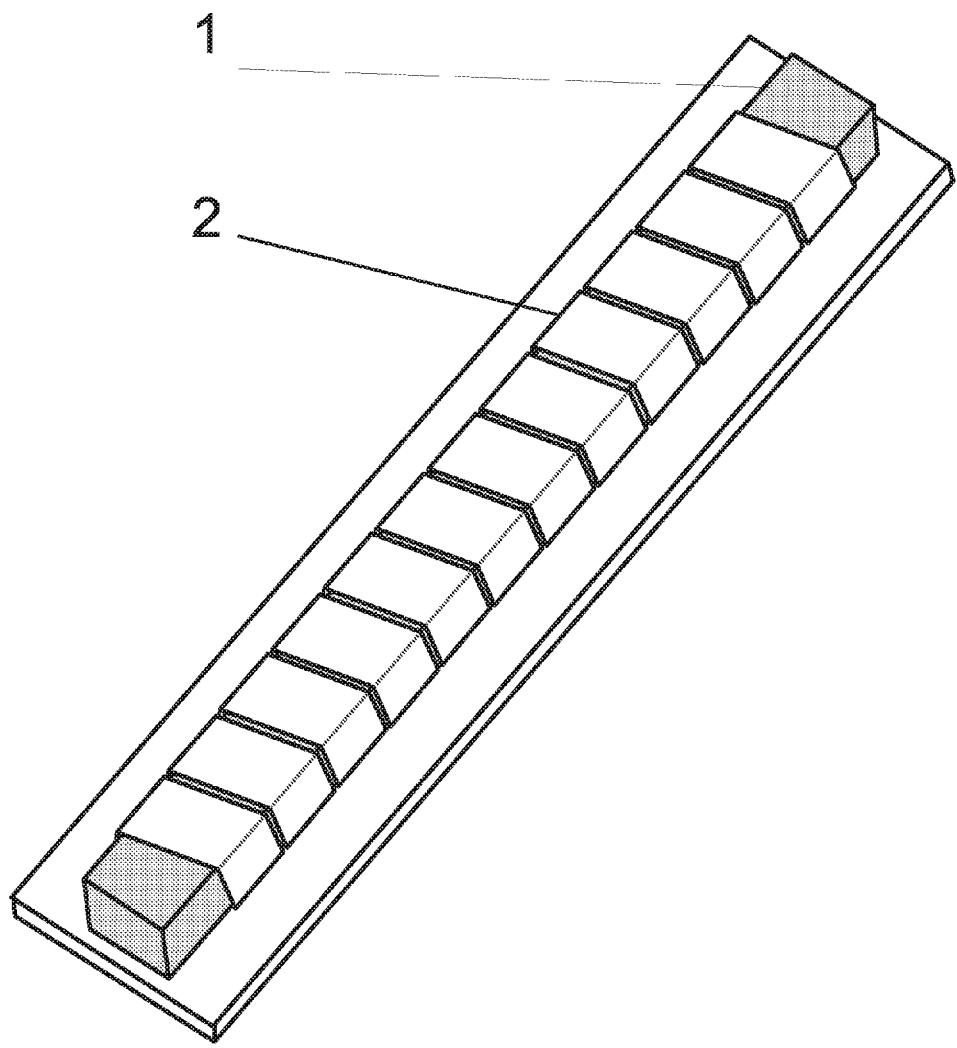
Figure 6:
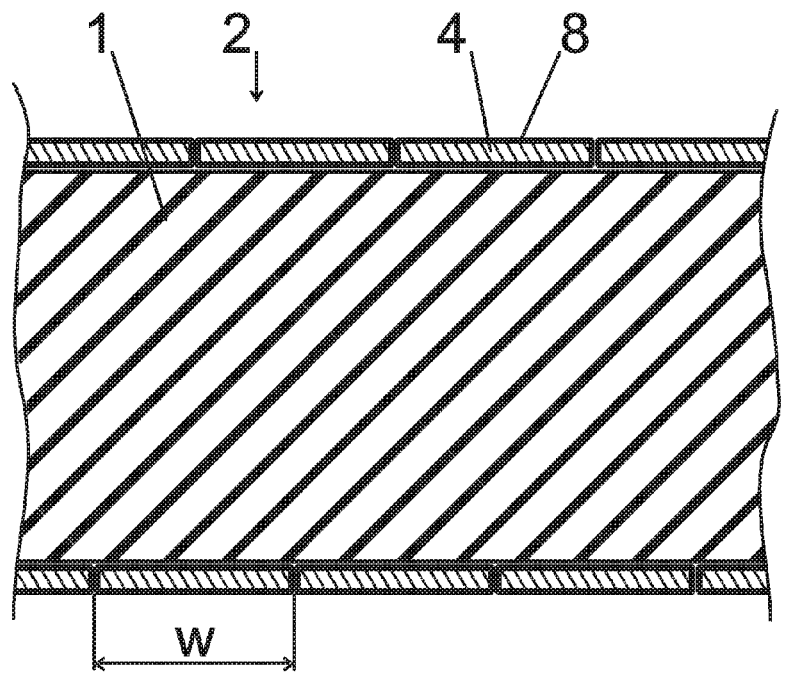

In this example, as shown in FIGS. 5 and 6, is used the flat insulated wire 4, the cross-sectional height of which corresponds approximately to one eighth of the cross-sectional width of the wire 4. The flat wire 4 can be used in the oval cross-sections of the core 1, where at small sizes and small radius of the rectangular core 1 rounding, there is no risk of damaging or breaking the wire 4 in his winding onto the core 1. In another example of construction, the wire 4 can be created on the core 1 by the vapor deposition of the metal layer, or other similar technology of coating a conductive path to the surface. On the core 1, a mask in the function of separating gaps between the threads 2, at least equal to the thickness of the wire 4 can be created. The mask in this case is in shape of a screw lead strip with a width forming inter-thread insulation 8. Then the metal layer is applied to form a flat, wide coil. By potential application of insulation on the edge of the wire 4 and then repeatedly applying the conductive layer strip, which will overlap the inter-thread gap, can arise the fitting of flat wire 4 edge limiting a magnetic field leakage out of the core 1 ends.

Example 3

Figure 7:
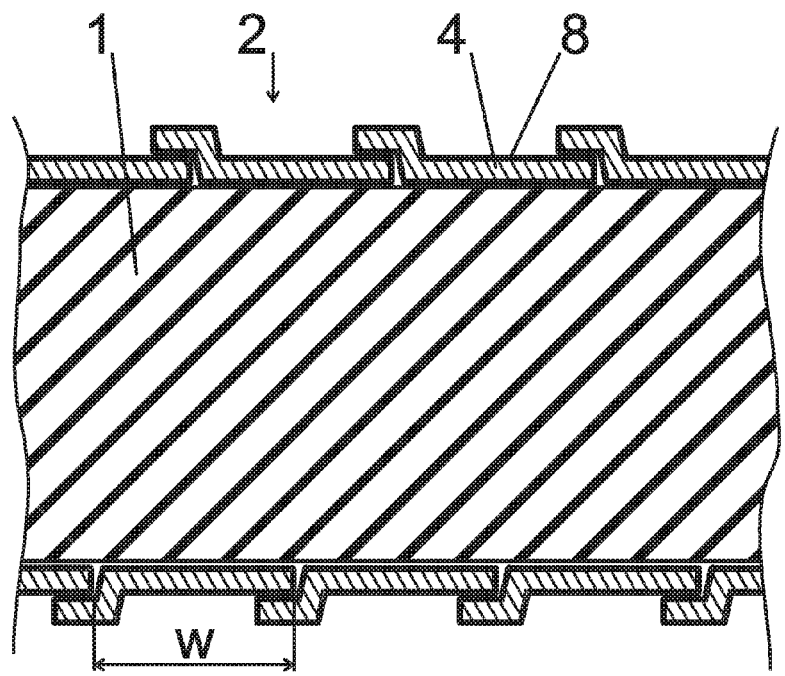
Figure 8:
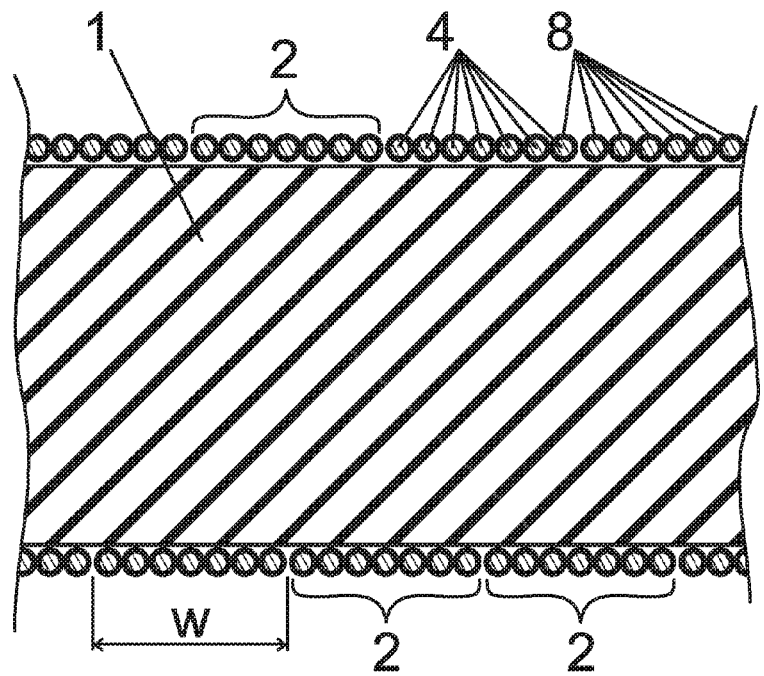

In this example, as shown in FIGS. 5 and 7 is the flat insulated wire 4 led across the edge of adjacent thread 2 to form a thread overlap to prevent penetration of the magnetic field between the threads. However, still remains the possibility of magnetic field leakage through a gap with a thickness that is twice the thickness of insulation 8 of the wire 4.

Example 4

Figure 9:
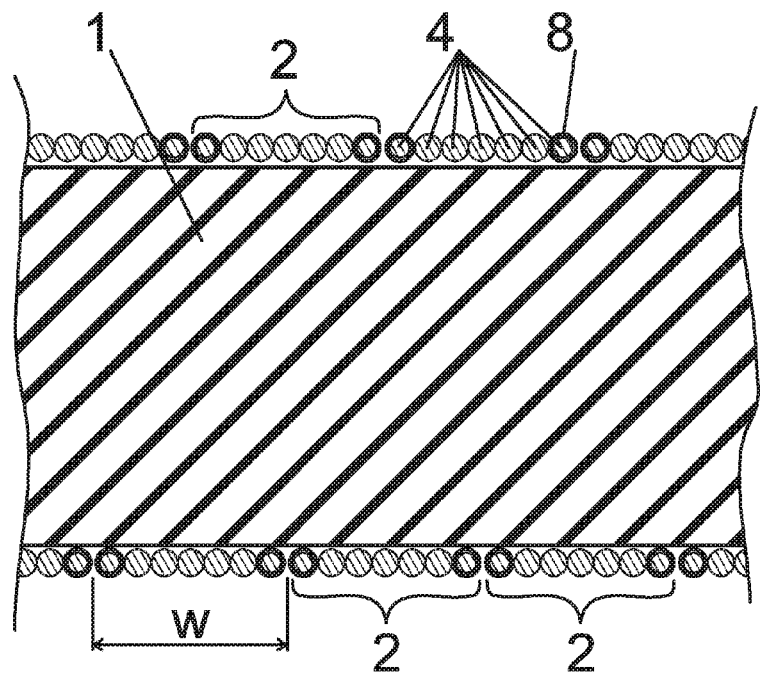
Figure 10:
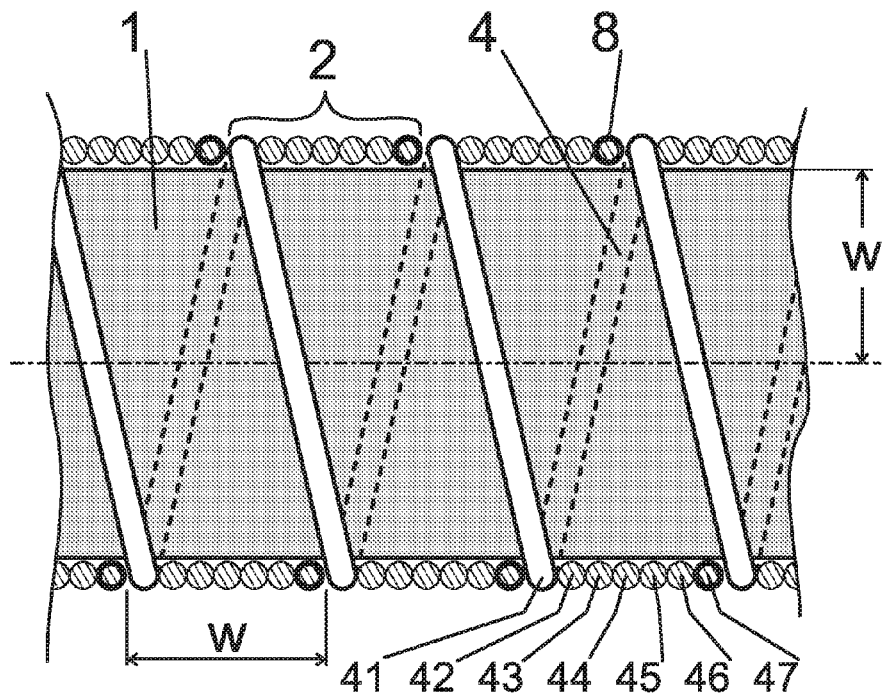

In this example, as shown in FIGS. 9 and 10 is used a combination of non-insulated wires 42, 43, 44, 45, 46 and insulated wires 41 and 47 One thread 2 is made up of seven wires 4, where the two marginal wires of the given threads 41 and 47 have insulation 8 to avoid inter-thread short circuit at tight winding. Non-insulated wires 42, 43, 44, 45, 46 are placed inside the group. As they do not have insulation 8, it will reduce the formation of gaps for magnetic field leakage and these wires 42, 43, 44, 45, 46 do not need to be electrically interconnected. Therefore, only the wires 41, 42, 46 a 47 are output to the connective pad 7.

Example 5

Figure 11:
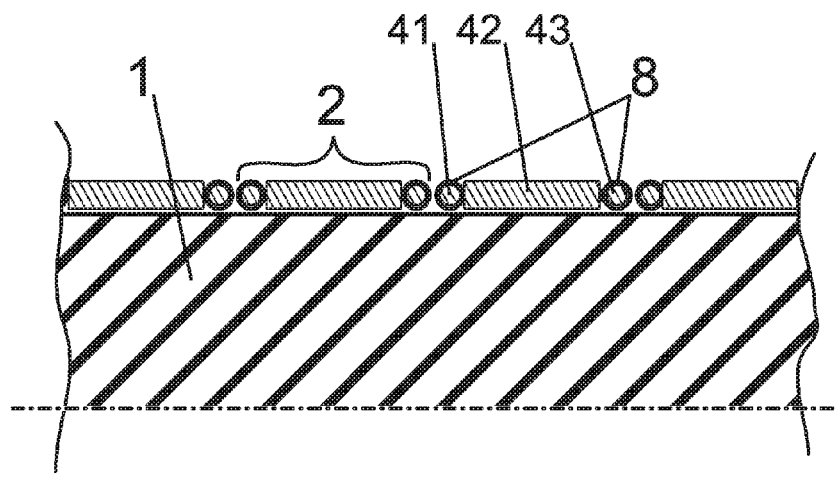
Figure 12:
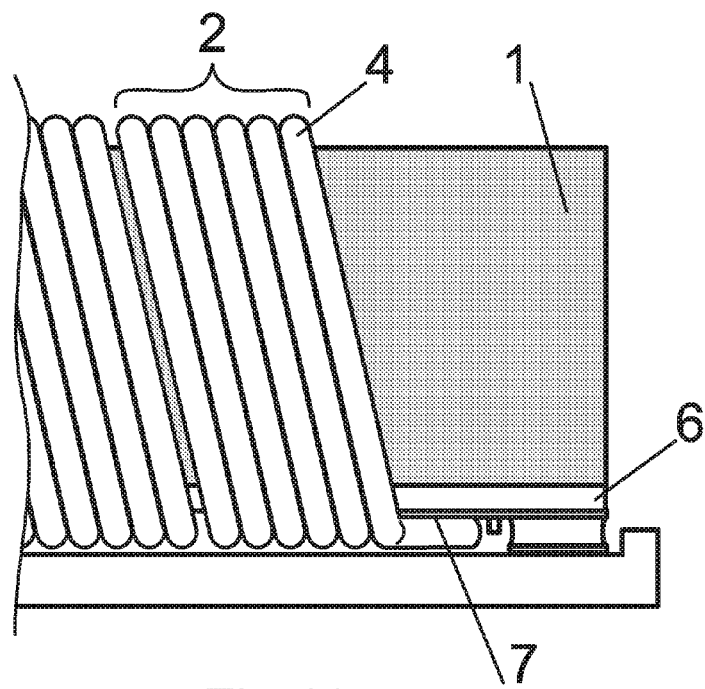
Figure 13:
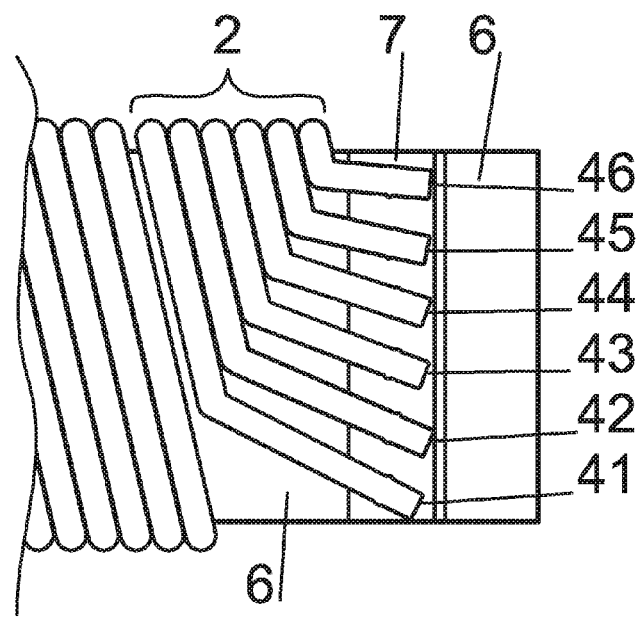
FIG. 13 shows the detail of one-tread-wire interconnection on a connecting pad, which is created on the bottom of non-conductive substrate.
Figure 14:
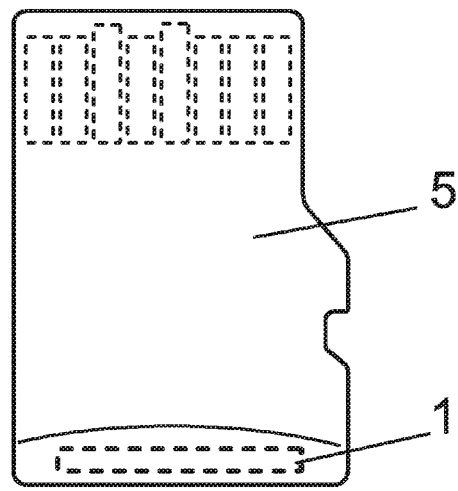
FIG. 14 depicts an example of the emitter location on the removable memory card of microSD format.

In this example, according to FIG. 11, for creation a single thread 2 is used a combination of one flat non-insulated wire 42 and two insulated wires 41, 43 with a classic circular cross-section. That combination makes production of emitters simple like the appropriate, available flat wires with a small thickness do not have any insulation. Boundary wires 41 and 43 form inter-thread insulation and are on the connecting pad 7 conductively linked to each other and also to the flat wire 42.

Example 6

In this example, the core 1 takes the form of a ferrite rod with a circular cross-section of the diameter 0.8 mm and the length of 7 mm. The emitter has 17 threads 2, the effective width w of the thread 2 is 0.41 mm. The ratio of the effective width of thread 2 to the radius of the core 1 is 1.025. The permeability of the core 1 is chosen so that at given emitter's size and winding the inductance was L=750 nH.

In this example there is an emitter placed on the removable memory card 5, which also contains the payment card function and for the communication between this payment card and a POS terminal, a data transmission method that uses two different frequencies is used. The POS terminal contains a contactless payment card reader. The cards have to approach the Operating volume of the reader in order for the communication connection to be established. The placement of the payment card containing a communication element into the mobile memory card 5 into the slot 12 deteriorates the possibility of full approach of the communication element on the payment card to the center of the reader's operational volume. At the same time, the mobile phone slot 12 is primarily designed for the insertion of a common memory card 5. For the communication element, for the slot 12, presents an undesirable shielding, part of the slot's 12 body is made of metallic shapes shell. The communication element contains the emitter according to this invention, and in this example, it is placed directly on the micro SD card. The card's 5 format does not limit the extent of this invention, in the future any format whatsoever could be used. The continuing miniaturization of the memory cards 5 and of the corresponding slots 12 deteriorates the possibilities of effective placement of the communication element on the card 5; however the solution described here solves the problem. The communication element uses the NFC platform. In real environment and in case of the mobile phone is handled in a normal way by the user the transformer connection coefficient is k=0.2-0.001.

The contents and the structure of the transmitted data can be different, in this example the data necessary during communication and authorization of payment processes will be dealt with. The owner of a mobile phone equips his device with a memory card 5 that is equipped with a non-stationary magnetic field emitter. By doing this, he extends the functionality of his mobile phone. In preferable configuration, there will be also a payment card, corresponding to a different invention of this patent's applicant, on the memory card 5. It is important, that the connection of a mobile phone with a memory card 5 will appear to the POS terminal and its payment card reader as a standard contactless card. So the structure of transmitted data will be in the accordance with the standards in payments. The advantage of the solution mentioned is a comfortable usability of the mobile phone user interface.

The emitter contains a generator of the electromagnetic waves with the frequency of 14.4075 MHz±7 kHz. This frequency is for 847 kHz higher than the receiver's frequency. The receiver's frequency is in the standard 13.56 MHz±7 kHz. The difference between the frequencies is 1/16 of the carrier frequency of the receiver. It is important, if the generator is connected and active to energize the emitter when data are transmitted over transformer connection, which was not used up till now. In case generator existed in the emitter in already existing solutions, the generator was not designed for active activity in the transformer connection, since it was not necessary due to the same transmitting frequency. The generator is connected to the resonant circuit, the output of which is connected to the antenna.

The data from the emitter on the memory card 5 are transmitted into the receiver in the POS terminal reader through the transformer connection of the emitter and receiver antenna inductions M. The data are modulated into the signal on the emitter's side and the receiver transmits the carrier signal. The distance of the emitter from the receiver will be in cm, basically, the mobile phone's body will be touching the reader, the transmission will be contactless in physical sense. The emitter can even move in the operational volume, while his speed would be lower than 1 m/s.

The emitter sends the signal with the frequency 14.4075 MHz±7 kHz, the receiver's carrier frequency is 13.56 MHz±7 kHz. The difference between the frequencies has a value that corresponds to the size of the subcarrier frequency, which is derived as a ¹⁄₁₆ of the carrier frequency according to the ISO 14443.

In antenna arrays of the receiver and the emitter, the signals of different frequencies are combined and in the receiver's on the antenna's output, the signal appears in the form of a connection of a carrier frequency and modulated subcarrier frequency with data. The carrier signal is separated from the result of the signal combination in the receiver. The result of this separation is a subcarrier signal, even though the emitter has never transmitted it physically. From the subcarrier signal the transmitted data are demodulated. The demodulation element, resonance circuit and receiver's generator have the same configuration and function as in today's existing technical solutions.

In this example, the basic time unit etu corresponds to the one bit time interval, so to the time necessary to transmit one data unit. In the data flow direction from the emitter into the receiver, the etu is defined as 1 etu=8/ft, where one ft is a frequency of the modulated signal that was transmitted by the emitter. The basic transmission velocity is 106 kbits/s. During modulation of the signal from the emitter, it is sufficient, if the phase is changed once per 1 etu (approx. once per 9.3 µs), so 16 times less frequently in comparison to the existing load modulation. Smaller broadband generates 12 dB less noise. The data transmitted are modulated directly by a change of the emitter's frequency signal phase, where $\phi=0°$ or $\phi=180°$. This modulated signal could also be called the emitter's carrier signal, since however the emitter does not create the subcarrier frequency, then, this frequency is only called the emitter's signal frequency.

The emitter is narrowly tuned to the transmitting frequency of 14.4075 MHz, it has the narrow and high course of the FFT curve. The emitter is tuned without considering the emitting characteristics for the transmission of the subcarrier frequencies 847 kHz. In case this antenna should transmit even the subcarrier frequency, the radiation characteristics would we insufficient for a reliable transmission. In the solution according to this invention, it is important that the signal radiation with the transmitted data is realized exactly on the 14.4075 MHz frequency, which is the peak of the FFT curve.

In this example, it is necessary to ensure even reverse data flow direction from the POS terminal reader into the memory card 5 in the mobile phone. The emitter encompasses the demodulation element, which is connected to the antenna inductance turning towards the sensor resistor, preferably over inductor. The usage of the inductor decreases the voltage peaks on the entrance to the demodulation element. Thanks to the turning and the inductor, the demodulation element can be dimensioned to a smaller voltage. In this data flow direction, the etu is defined as 1 etu=128/fr, where fr is the carrier frequency of the receiver.

Example 7

The ferrite core 1, in a form of ferrite rod with angular cross-section, is coated by conductive layer, which forms the wire 4. First, on the core 1 is placed a screw led mask, which will separate threads 2 apart. Then, the core 1 is coated by a metal layer where, due to a separating mask, is created the coil with desired number of threads 2. The gap created by a mask represents the inter-thread insulation. The ending of a coated metal layer on the sides of the core 1 form connecting pads 7 which then attach the whole emitter element to the substrate.

In this example (but it may also be related with other examples), the emitter is located on the mobile phone PCB board 10. The telephone has a housing with metal parts, which represents shielding covers 3. Thanks to the use of the emitter according to this invention, essentially, the emitter can be placed on any free space on the PCB board 10 and there are no problems with a poor magnetic field penetration out of the mobile phone's body.

Example 8

The emitter, as shown in FIG. 23, is made similar to examples 1 to 7. Mobile phones manufacturer designs new models in a way that when designing PCB board 10, is not limited by the demands for the known types of NFC antennas. Different types and models of mobile phones are equipped with one type of emitter type directly on the PCB board 10.

Example 9

The emitter is located in the SIM card 9. The core 1 of the emitter is in different versions according to FIGS. 19 to 22 oriented and located differently.

Example 10

The emitter as shown in FIG. 24 is placed in the body of the mobile phone battery 11. Basically, it is a charging accumulator 11, which, however, is commonly called a battery 11. In regard to a small thickness of the core 1, the emitter is placed on the surface of a common battery 11 under the last layer of the plastic battery 11 housing.

Example 11

NanoSIM card 9 slot 12, as shown in FIG. 26, has a holder of shaped metal plate. The slot 12 includes an amplifying element 13 in the form of a ferrite foil. NanoSIM card 9 has the emitter on the edge of the card's body of the card.

INDUSTRIAL APPLICABILITY

Industrial applicability is obvious. According to this invention, it is possible to produce, by industry and repeatedly, and use non-stationary magnetic field emitters in the capacity of an antenna placed directly on the removable memory card with a high emissivity and small size. A new type of emitter modulation substantially reduces noise and allows to increase the magnetic field intensity in the emitter's core.

LIST OF RELATED SYMBOLS

1—core
2—thread
3—magnetic field flow barrier
4—wire
41, 42, 43, 44, 45, 46, 47 to 4N—wires of one thread/one-thread wires
5—removable memory card 6—non-conductive substrate
7—connecting pad
8—wire insulation
9—SIM card
10—PCB board
11—accumulator/battery
12—slot
13—amplifying element
w—effective width of thread
PCB—printed circuit board RFID—Radio-frequency identification
NFC—near field communication SD—Secure Digital
POS—point of sale SIM—Subscriber Identity Module

The invention claimed is:

1. A non-stationary magnetic field emitter in the capacity of a miniature antenna on a flat carrier, where the emitter has an oblong core with permeability higher than 1, the core is at least partially ferrite, and a wire with at least two threads is wound on the core, the emitter forming an element for creating a contactless NFC or RFID communication channel, where a signal transmitted from the emitter is received by a standard NFC or RFID receiving means, wherein the threads are placed on the core in one layer, or most in two layers, the threads are placed on the core tightly next to each other to limit magnetic field emission from the core outside of its ends, and the effective width w of one thread corresponds to 0.25 to 1.75 times the radius of the core at a circular cross-section of the core or corresponds to 0.25 to 1.75 times the equivalent radius for other core shapes, whereby the effective width w of one thread is a width of the thread in case the adjacent threads are not interlaced, and a width of the thread minus an overlapping edge in case the adjacent threads are interlaced.

2. The non-stationary magnetic field emitter according claim 1, wherein the effective width w of one thread corresponds to 0.85 to 1.15 times the radius of the core at the core circular cross-section, or corresponds to 0.85 to 1.15 times the equivalent radius for other core shapes.

3. The non-stationary magnetic field emitter according to claim 1, wherein a smaller parameter of the core cross-section is less than 1 mm, and a length of the core is more than 7 times the smaller parameter of the core cross-section.

4. The non-stationary magnetic field emitter according to claim 1, wherein the core cross-section is of circular shape, elliptical, or at least partially rectangular shape, with square or oblong shape and with curved corners, or has a cross-section formed by combining these shapes.

5. The non-stationary magnetic field emitter according to claim 1 wherein the core is of a direct rod shape.

6. The non-stationary magnetic field emitter according to claim 1 wherein the core has a height of less than 1 mm, a width of less than 5 mm, and a length of less than 15 mm.

7. The non-stationary magnetic field emitter according to claim 1 wherein the wire is flat and has a width exceeding twice a height of the wire in cross-section.

8. The non-stationary magnetic field emitter according to claim 7, wherein the flat wire is along an edge overlapped with an adjacent thread wire where overlap is provided with insulation.

9. The non-stationary magnetic field emitter according to claim 1, wherein the coil includes several parallel wires forming a multistage thread, the wires of one thread being electrically interconnected on the sides of the core.

10. The non-stationary magnetic field emitter according to claim 9, wherein the multi-stage wires are at the ends of the coil and are attached to connecting pads, where the wires are at a distance from each other.

11. The non-stationary magnetic field emitter according to claim 9, wherein the multi-stage wires of one thread are electrically insulated on a surface of the core.

12. The non-stationary magnetic field emitter according to claim 1, wherein the wire is formed by applying a metal coating onto a surface of the core in the gaps between the threads.

13. The non-stationary magnetic field emitter according to claim 1, wherein a permeability of the core is chosen so that at a given wire coil the emitter has an inductance of 600 nH to 1200 nH.

14. The non-stationary magnetic field emitter according to claim 1, wherein the emitter is tuned to a transmission frequency so that its resonant frequency is close to the transmission frequency when placing the emitter close to a magnetic field flow barrier, wherein a proximity of the flow barrier reduces an inductance of the emitter, and wherein after removal of the flow barrier the emitter inductance increases, internal resistance of the emitter increases and the resonance frequency decreases and moves off the transmission frequency.

15. The non-stationary magnetic field emitter according to claim 14, wherein the frequency and/or inductance and/or internal resistance is preset to a maximum transmission power in a most unfavorable shielding, where a reduction of shielding degree by its relationship with the surroundings decreases the transmission power at the same input where shielding elements of the environment affect the frequency and/or inductance and/or internal resistance of the emitter, while also at zero shielding the emitter transmission power exceeds a minimum power for reception by means of standard NFC or RFID.

16. The non-stationary magnetic field emitter according to claim 1, wherein the core is formed by a ferrite rod placed on a non-conductive substrate, the non-conductive substrate having a width corresponding to a width of the core and a length equal or exceeding the length of the core, wires of threads being mechanically wound across a ferrite rod and also across the non-conductive substrate, whereby a coil of wire connects the core with the non-conductive substrate, the non-conductive thread having along the side of the core connecting pads the wires of the coil and to connect the emitter with the body of the host device.

17. The non-stationary magnetic field emitter according to claim 16, wherein the non-conductive substrate is made of a dielectric material having a thickness of less than one-eighth a height of the core.

18. The non-stationary magnetic field emitter according to claim 1, wherein the coil of threads is covered by a conductive shielding cover, which is connected to ground.

19. The non-stationary magnetic field emitter according to claim 1, wherein the emitter is placed on a substrate of a removable memory card.

20. The non-stationary magnetic field emitter according to claim 19, wherein an axis of the core of the emitter is oriented predominantly parallel to a surface of the removable memory card, and the emitter is placed at an edge of the removable memory card, out of a zone of a contact interface of the removable memory card.

21. The non-stationary magnetic field emitter according to claim 1, wherein the emitter is placed on a PCB board of a host device.

22. The non-stationary magnetic field emitter according to claim 21, wherein an axis of the core is oriented parallel to a predominant outer surface of the host device.

23. The non-stationary magnetic field emitter according to claim 1, wherein the emitter is placed on a SIM card.

24. The non-stationary magnetic field emitter according to claim 1, wherein the emitter is placed within a body of a removable battery of a mobile phone.

25. The non-stationary magnetic field emitter according to claim 1, wherein an amplifying element is stably positioned in a slot or connector of a host device.

26. The non-stationary magnetic field emitter according to claim 25, wherein the amplifying element is a ferrite foil, a ferrite board, or a resonant circuit.

27. A system including the non-stationary magnetic field emitter according to claim 1 and a receiver, the system adapted to transfer data from the emitter to receiver via a mutual transformer connection, where the receiver contains a generator, an antenna, and a demodulation element, the emitter is connected with a modulation element and an electromagnetic wave generator, and wherein the receiver is adapted to transmit a carrier signal to the emitter at a first frequency, the receiver is adapted to receive a signal on the output of its antenna, where the signal appears in the form of a carrier frequency at the first frequency and a modulated subcarrier signal with data transmitted at a second frequency, and the receiver is adapted to separate the carrier signal from the signal on the output of its antenna and demodulate the transmitted data, wherein the electromagnetic wave generator connected to the emitter is adapted to energize with a frequency different from a frequency of the receiver, the difference between those frequencies corresponding to a subcarrier frequency so that a signal, which is received and demodulated on the side of the receiver, is created by combining the carrier signal transmitted by the receiver with the modulated data transmitted by the emitter.

28. The system according to claim 27, wherein the emitter is narrowly tuned to the transmission frequency independent of emissive characteristics for the subcarrier frequency expected by the receiver.

29. The system according to claim 27, wherein the demodulation element is connected to a turning of the antenna's induction towards a sensor resistor via an inductor.

30. A data modulation method for transmitting data from the non-stationary magnetic field emitter of claim 1 to a receiver via a mutual transformer connection, the receiver containing a generator, an antenna, and a demodulation element, and the emitter being connected with a modulation element and an electromagnetic wave generator connected to a transformer via respective antennas, comprising the steps of:
   the receiver transmitting a carrier signal to the emitter at a first frequency,
   the emitter modulating data and sending the modulated data to the receiver in the form of the carrier signal at the first frequency and a modulated subcarrier signal with data transmitted at a second frequency with respect to the first frequency,
   the receiver receiving a signal with the modulated data on an output of said antenna, and
   the receiver separating the carrier signal from the signal on the output of the antenna and demodulating the transmitted data,
   wherein the electromagnetic wave generator connected to the emitter is energized with a frequency different from a frequency of the receiver, the difference between those frequencies corresponding to a subcarrier frequency, whereas the signal, which is received and modulated on the receiver's side, is formed by combining the transmitted carrier signal with modulated data transmitted by the emitter.

31. The data modulation method according to claim 30, wherein the transmitted data is modulated by a change of frequency signal phase of the receiver.

32. The data modulation method according to claim 31, wherein a phase of the transmitted frequency is changed once per etu (elementary time unit), whereas etu corresponds to one bit interval.

33. The data modulation method according to claim 30, wherein the carrier signal of the receiver has a frequency of 13.56 MHz±7 kHz, where a difference between the receiver's signal carrier frequency and the transmitter's frequency is formed entirely by a fraction of the carrier frequency.

* * * * *